US012452219B2

(12) United States Patent
Basher et al.

(10) Patent No.: US 12,452,219 B2
(45) Date of Patent: Oct. 21, 2025

(54) NETWORK DEVICE WITH DATAGRAM TRANSPORT LAYER SECURITY SELECTIVE SOFTWARE OFFLOAD

(71) Applicant: MELLANOX TECHNOLOGIES, LTD., Yokneam (IL)

(72) Inventors: Uria Basher, Nehusha (IL); Michael Tahar, Yavne (IL); Amir Modan, Meitar (IL); Ben Witulski, Tel Aviv (IL); Miriam Menes, Tel Aviv (IL); Miri Shtaif, Givatayim (IL)

(73) Assignee: Mellanox Technologies, Ltd, Yokneam (IL)

( * ) Notice: Subject to any disclaimer, the term of this patent is extended or adjusted under 35 U.S.C. 154(b) by 76 days.

(21) Appl. No.: 18/626,354

(22) Filed: Apr. 4, 2024

(65) Prior Publication Data
US 2024/0406148 A1 Dec. 5, 2024

(30) Foreign Application Priority Data

Jun. 1, 2023 (IL) .......................... 303397
Sep. 27, 2023 (IL) .......................... 307302

(51) Int. Cl.
*H04L 9/40* (2022.01)
(52) U.S. Cl.
CPC ........ *H04L 63/0428* (2013.01); *H04L 63/166* (2013.01)
(58) Field of Classification Search
None
See application file for complete search history.

(56) References Cited

U.S. PATENT DOCUMENTS 6,901,496 B1   5/2005  Mukund et al.
7,657,659 B1   2/2010  Lambeth et al.
(Continued)

FOREIGN PATENT DOCUMENTS

EP   1657878 A1    5/2006
EP   2463782 A2    6/2012
WO   2010062679 A2  6/2010

OTHER PUBLICATIONS

Shirey., "Internet Security Glossary, Version 2", Request for Comments 4949, pp. 1-365, Aug. 2007.
(Continued)

*Primary Examiner* — Backhean Tiv
(74) *Attorney, Agent, or Firm* — Meitar Patents Ltd.; Daniel Kligler

(57) ABSTRACT

In one embodiment, a system includes a networking device including a network interface to receive network packets having headers including datagram transport layer security (DTLS) headers from a remote device over a packet data network, packet processing circuitry to identify first packets of the received packets for DTLS processing in the packet processing circuitry, identify second packets of the received packets to bypass DTLS processing in the packet processing circuitry and to be provided to software to perform DTLS processing on the second packets, and perform DTLS processing on the first packets, and a host interface to provide the DTLS processed first packets to the software, and provide the second packets to the software to perform DTLS processing on the second packets.

25 Claims, 15 Drawing Sheets

(56) References Cited

U.S. PATENT DOCUMENTS

| | | | |
|---|---|---|---|
| 8,006,297 B2* | 8/2011 | Johnson | H04L 69/12 |
| | | | 713/153 |
| 8,103,785 B2* | 1/2012 | Crowley | H04L 12/66 |
| | | | 709/213 |
| 8,824,492 B2 | 9/2014 | Wang et al. | |
| 8,879,435 B1 | 11/2014 | Andersson | |
| 9,002,002 B1 | 4/2015 | Poo et al. | |
| 9,038,073 B2 | 5/2015 | Kohlenz et al. | |
| 9,460,031 B1* | 10/2016 | Dalal | G06F 13/4022 |
| 9,678,818 B2 | 6/2017 | Raikin et al. | |
| 9,904,568 B2 | 2/2018 | Vincent et al. | |
| 10,078,613 B1 | 9/2018 | Ramey | |
| 10,120,832 B2 | 11/2018 | Raindel et al. | |
| 10,135,739 B2* | 11/2018 | Raindel | H04L 63/04 |
| 10,152,441 B2 | 12/2018 | Liss et al. | |
| 10,210,125 B2 | 2/2019 | Burstein | |
| 10,218,645 B2 | 2/2019 | Raindel et al. | |
| 10,382,350 B2* | 8/2019 | Bohrer | H04L 47/6235 |
| 10,423,774 B1 | 9/2019 | Zelenov et al. | |
| 10,715,451 B2 | 7/2020 | Raindel et al. | |
| 10,824,469 B2 | 11/2020 | Hirshberg et al. | |
| 10,841,243 B2* | 11/2020 | Levi | H04L 67/10 |
| 10,956,346 B1 | 3/2021 | Ben-Yehuda et al. | |
| 11,418,454 B2 | 8/2022 | Pismenny et al. | |
| 11,502,948 B2* | 11/2022 | Pismenny | H04L 12/413 |
| 11,558,175 B2 | 1/2023 | Menes et al. | |
| 11,683,266 B2 | 6/2023 | Pismenny et al. | |
| 11,765,079 B2 | 9/2023 | Pismenny et al. | |
| 12,021,759 B2* | 6/2024 | Wang | G06F 13/385 |
| 2003/0023846 A1 | 1/2003 | Krishna et al. | |
| 2003/0226018 A1 | 12/2003 | Tardo et al. | |
| 2004/0039940 A1 | 2/2004 | Cox et al. | |
| 2004/0057434 A1 | 3/2004 | Poon et al. | |
| 2004/0062267 A1 | 4/2004 | Minami et al. | |
| 2004/0158710 A1 | 8/2004 | Buer et al. | |
| 2005/0102497 A1 | 5/2005 | Buer | |
| 2005/0198412 A1 | 9/2005 | Pedersen et al. | |
| 2006/0095754 A1 | 5/2006 | Hyder et al. | |
| 2006/0104308 A1 | 5/2006 | Pinkerton et al. | |
| 2007/0101130 A1 | 5/2007 | Tardo | |
| 2008/0147822 A1 | 6/2008 | Benhase et al. | |
| 2008/0260158 A1 | 10/2008 | Chin et al. | |
| 2008/0313364 A1 | 12/2008 | Flynn et al. | |
| 2009/0080647 A1 | 3/2009 | Mantin et al. | |
| 2009/0086736 A1 | 4/2009 | Foong et al. | |
| 2009/0106771 A1 | 4/2009 | Benner et al. | |
| 2009/0319775 A1 | 12/2009 | Buer et al. | |
| 2009/0328170 A1 | 12/2009 | Williams et al. | |
| 2010/0228962 A1 | 9/2010 | Simon et al. | |
| 2011/0119673 A1 | 5/2011 | Bloch et al. | |
| 2011/0246597 A1 | 10/2011 | Swanson et al. | |
| 2012/0314709 A1 | 12/2012 | Post et al. | |
| 2013/0080651 A1 | 3/2013 | Pope et al. | |
| 2013/0125125 A1 | 5/2013 | Karino et al. | |
| 2013/0142205 A1 | 6/2013 | Munoz | |
| 2013/0263247 A1 | 10/2013 | Jungck et al. | |
| 2013/0276133 A1 | 10/2013 | Hodges et al. | |
| 2013/0329557 A1* | 12/2013 | Petry | H04L 41/00 |
| | | | 370/235 |
| 2013/0347110 A1 | 12/2013 | Dalal | |
| 2014/0129741 A1 | 5/2014 | Shahar et al. | |
| 2014/0185616 A1 | 7/2014 | Bloch et al. | |
| 2014/0244983 A1* | 8/2014 | McDonald | G06F 9/5088 |
| | | | 712/225 |
| 2014/0254593 A1 | 9/2014 | Mital et al. | |
| 2014/0282050 A1 | 9/2014 | Quinn et al. | |
| 2014/0282561 A1 | 9/2014 | Holt et al. | |
| 2014/0355754 A1 | 12/2014 | Leung et al. | |
| 2015/0100962 A1 | 4/2015 | Morita et al. | |
| 2015/0131447 A1 | 5/2015 | Petry et al. | |
| 2015/0288624 A1 | 10/2015 | Raindel et al. | |
| 2015/0347185 A1 | 12/2015 | Holt et al. | |
| 2015/0355938 A1 | 12/2015 | Jokinen et al. | |
| 2016/0065659 A1 | 3/2016 | Bloch et al. | |
| 2016/0132329 A1 | 5/2016 | Gupte et al. | |
| 2016/0226822 A1 | 8/2016 | Zhang et al. | |
| 2016/0306668 A1 | 10/2016 | Heil et al. | |
| 2016/0342547 A1 | 11/2016 | Liss et al. | |
| 2016/0350151 A1 | 12/2016 | Zou et al. | |
| 2016/0378529 A1 | 12/2016 | Wen | |
| 2017/0075855 A1 | 3/2017 | Sajeepa et al. | |
| 2017/0180273 A1 | 6/2017 | Daly et al. | |
| 2017/0237672 A1 | 8/2017 | Dalal | |
| 2017/0264622 A1 | 9/2017 | Cooper et al. | |
| 2017/0286157 A1 | 10/2017 | Hasting et al. | |
| 2017/0371835 A1 | 12/2017 | Ranadive et al. | |
| 2018/0004954 A1 | 1/2018 | Liguori et al. | |
| 2018/0067893 A1 | 3/2018 | Raindel et al. | |
| 2018/0109471 A1 | 4/2018 | Chang et al. | |
| 2018/0114013 A1 | 4/2018 | Sood et al. | |
| 2018/0167364 A1 | 6/2018 | Dong et al. | |
| 2018/0210751 A1 | 7/2018 | Pepus et al. | |
| 2018/0219770 A1 | 8/2018 | Wu et al. | |
| 2018/0219772 A1 | 8/2018 | Koster et al. | |
| 2018/0246768 A1 | 8/2018 | Palermo et al. | |
| 2018/0262468 A1 | 9/2018 | Kumar et al. | |
| 2018/0285288 A1 | 10/2018 | Bernat et al. | |
| 2018/0329828 A1 | 11/2018 | Apfelbaum et al. | |
| 2019/0012350 A1 | 1/2019 | Sindhu et al. | |
| 2019/0026157 A1 | 1/2019 | Suzuki et al. | |
| 2019/0044705 A1 | 2/2019 | Deval et al. | |
| 2019/0102568 A1 | 4/2019 | Hausauer et al. | |
| 2019/0116127 A1 | 4/2019 | Pismenny et al. | |
| 2019/0123891 A1 | 4/2019 | Pismenny et al. | |
| 2019/0132118 A1 | 5/2019 | Ghosh et al. | |
| 2019/0163364 A1 | 5/2019 | Gibb et al. | |
| 2019/0173846 A1 | 6/2019 | Patterson et al. | |
| 2019/0190892 A1 | 6/2019 | Menachem et al. | |
| 2019/0199835 A1 | 6/2019 | Deval et al. | |
| 2019/0250938 A1 | 8/2019 | Claes et al. | |
| 2020/0012604 A1 | 1/2020 | Agarwal | |
| 2020/0026656 A1 | 1/2020 | Liao et al. | |
| 2020/0169383 A1 | 5/2020 | Durham et al. | |
| 2020/0236140 A1 | 7/2020 | Srinivasan et al. | |
| 2020/0259803 A1 | 8/2020 | Menachem et al. | |
| 2020/0314181 A1 | 10/2020 | Eran et al. | |
| 2020/0401440 A1 | 12/2020 | Sankaran et al. | |
| 2022/0394081 A1 | 12/2022 | Efraim et al. | |
| 2023/0097439 A1 | 3/2023 | Menes et al. | |
| 2023/0107406 A1 | 4/2023 | Menes et al. | |
| 2024/0406148 A1* | 12/2024 | Basher | H04L 63/0485 |
| 2024/0406212 A1* | 12/2024 | Pismenny | H04L 63/166 |

OTHER PUBLICATIONS

Information Sciences Institute, "Transmission Control Protocol; DARPA Internet Program Protocol Specification", Request for Comments 793, pp. 1-90, Sep. 1981.

InfiniBand TM Architecture Specification vol. 1, Release 1.3, pp. 1-1842, Mar. 3, 2015.

Stevens., "TCP Slow Start, Congestion Avoidance, Fast Retransmit, and Fast Recovery Algorithms", Request for Comments 2001, pp. 1-6, Jan. 1997.

Netronome Systems, Inc., "Open vSwitch Offload and Acceleration with Agilio® CX SmartNICs", White Paper, pp. 1-7, Mar. 2017.

PCI Express® Base Specification, Revision 3.0, pp. 1-860, Nov. 10, 2010.

Dierks et al., "The Transport Layer Security (TLS) Protocol Version 1.2", Request for Comments: 5246, pp. 1-104, Aug. 2008.

Turner et al., "Prohibiting Secure Sockets Layer (SSL) Version 2.0", Request for Comments: 6176, pp. 1-4, Mar. 2011.

Rescorla et al., "The Transport Layer Security (TLS) Protocol Version 1.3", Request for Comments: 8446, pp. 1-160, Aug. 2018.

Comer., "Packet Classification: A Faster, More General Alternative to Demultiplexing", The Internet Protocol Journal, vol. 15, No. 4, pp. 12-22, Dec. 2012.

Salowey et al., "AES Galois Counter Mode (GCM) Cipher Suites for TLS", Request for Comments: 5288, pp. 1-8, Aug. 2008.

Burstein, "Enabling Remote Persistent Memory", SNIA—PM Summit, pp. 1-24, Jan. 24, 2019.

(56) References Cited

OTHER PUBLICATIONS

Chung et al., "Serving DNNs in Real Time at Datacenter Scale with Project Brainwave", IEEE Micro Pre-Print, pp. 1-11, Mar. 22, 2018.
Talpey, "Remote Persistent Memory—With Nothing But Net", SNIA—Storage developer conference , pp. 1-30, year 2017.
Microsoft, "Project Brainwave", pp. 1-5, year 2019.
NVM Express Inc., "Nvm ExpressTM Base Specification", Revision 1.4, p. 1-403, Jun. 10, 2019.
Pismenny et al., "Autonomous NIC Offloads", submitted for evaluation of the 26th International Conference on Architectural Support for Programming Languages and Operating Systems (ASPLOS '21), p. 1-18, Dec. 13, 2020.
Lebeane et al., "Extended Task queuing: Active Messages for Heterogeneous Systems", Proceedings of the International Conference for High Performance Computing, Networking, Storage and Analysis (SC'16), pp. 933-944, Nov. 2016.
Wikipedia, "Random Early Detection," pp. 1-4, Jul. 2022.
Study CCNP, "Qos Marketing Mechanism Explained," study-ccnp.com, p. 1-3, year 2022.
Jayasumana et al., "Improved Packet Reordering Metrics," RFC 5236, Network Working Group, pp. 1-26, Jun. 2008.
Hewlett-Packard Development Company, L.P., "QoS Queue Configuration," pp. 1-4, year 2015.
Rescorla et al., "The Datagram Transport Layer Security (DTLS) Protocol Vesion 1.3," RFC 9147, Internet Engineering Task Force (IETF), pp. 1-64, Apr. 2022.
Pismenny, U.S. Appl. No. 18/483,547, filed Oct. 10, 2023.
Eddy (Ed.), "Transmission Control Protocol (TCP)," RFC 9293, Internet Engineering Task Force (IETF), pp. 1-98, Aug. 2022.
Wikipedia, "User Datagram Protocol," pp. 1-4, last edited Aug. 6, 2024 There is a multitude of earlier versions in archive but impossible to download (priority dates are Jan. 6, 2023 and Sep. 26, 2023 https://en.wikipedia.org/wiki/User_Datagram_Protocol.
EP Application # 24179236.5 Search Report dated Jul. 31, 2024.
Rescorla et al., "Datagram Transport Layer Security Version 1.2," RFC 6347, Internet Engineering Task Force (IETF), pp. 1-32, Jan. 2012.
Shalom et al., U.S. Appl. No. 18/143,411, filed May 4, 2023.
Wikipedia, "Internet Protocol Security (IPsec)," pp. 1-8, last edited May 11, 2023.
Github, "PSP Architecture Specification," Google, pp. 1-25, Nov. 17, 2022.
IEEE Std. 802.1AE™-2018, "IEEE Standard for Local and Metropolitan Area Networks—Media Access Control (MAC) Security," IEEE Computer Society, pp. 1-239, Sep. 27, 2018.
Menes et al., U.S. Appl. No. 18/528,603, filed Dec. 4, 2023.
Pismenny et al., U.S. Appl. No. 18/595,475, filed Mar. 5, 2024.

* cited by examiner

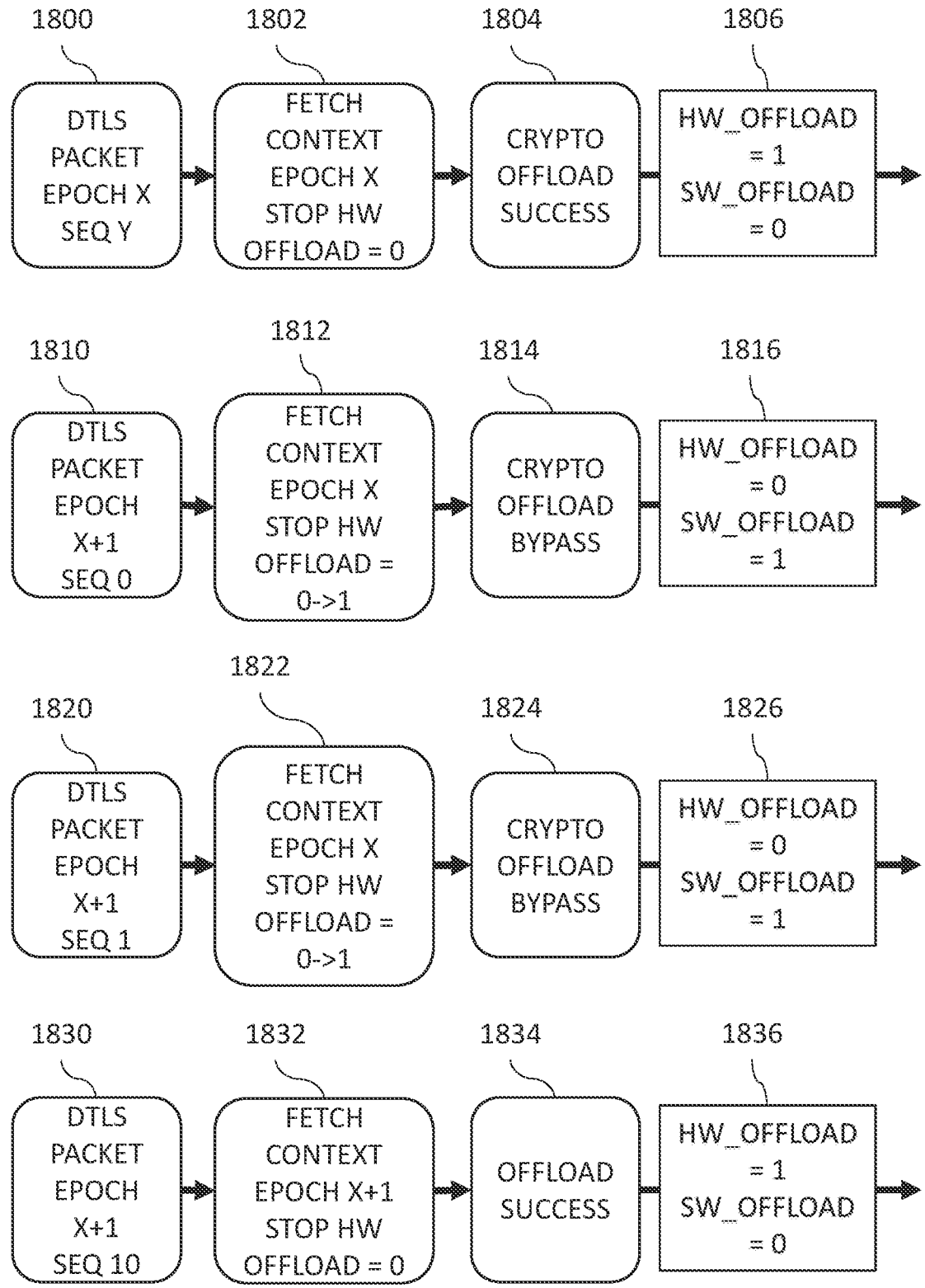

NETWORK DEVICE WITH DATAGRAM TRANSPORT LAYER SECURITY SELECTIVE SOFTWARE OFFLOAD

RELATED APPLICATION INFORMATION

The present application claims priority from Israel Patent Application 303,397 of Mellanox Technologies, Ltd., filed 1 Jun. 2023, and Israel Patent Application 307,302 of Mellanox Technologies, Ltd., filed 27 Sep. 2023, the disclosures of which are hereby incorporated herein by reference.

FIELD OF THE DISCLOSURE

The present disclosure relates to computer systems, and in particular, but not exclusively to, a network device with transport layer security.

BACKGROUND

The Datagram Transport Layer Security (DTLS) Protocol (e.g., Version 1.3) is used to secure User datagram protocol (UDP) traffic and in addition to providing security features (such as preventing eavesdropping, tampering, or message forgery), also includes other features included in Transmission Control Protocol (TCP), but not included in UDP (such as packet reordering, and processing loss of datagram and data larger than the size of a datagram network packet for handshake messages).

DTLS is managed at the host level, with host devices (e.g., client-server software) setting up a DTLS session including establishing cryptographic information (such as keys) and then managing the session including generating DTLS headers and performing cryptographic operations such as encryption, decryption, and authentication etc.

SUMMARY

There is provided in accordance with still another embodiment of the present disclosure, a system, including a networking device, including a network interface to receive network packets having headers including datagram transport layer security (DTLS) headers from a remote device over a packet data network, packet processing circuitry to identify first packets of the received packets for DTLS processing in the packet processing circuitry, identify second packets of the received packets to bypass DTLS processing in the packet processing circuitry and to be provided to software to perform DTLS processing on the second packets, and perform DTLS processing on the first packets, and a host interface to provide the DTLS processed first packets to the software, and provide the second packets to the software to perform DTLS processing on the second packets.

Further in accordance with an embodiment of the present disclosure the packet processing circuitry includes DTLS processing circuitry to find at least one decryption key based on source and destination data of at least one DTLS header of the first packets, decrypt and authenticate the first packets based on the at least one decryption key, and perform replay protection checks based on DTLS sequence numbers of the first packets.

Still further in accordance with an embodiment of the present disclosure, the system includes a host device including a processor to execute the software to receive the second packets, and perform DTLS processing on the second packets.

Additionally in accordance with an embodiment of the present disclosure the software is to find at least one decryption key based on source and destination data of at least one DTLS header of the second packets, decrypt and authenticate the second packets based on the at least one decryption key, and perform replay protection checks based on DTLS sequence numbers of the second packets.

Moreover, in accordance with an embodiment of the present disclosure the packet processing circuitry is to generate completion queue elements (CQEs) for the second packets indicating that the packets are being offloaded to the software to perform DTLS processing on the second packets.

Further in accordance with an embodiment of the present disclosure the packet processing circuitry includes DTLS processing circuitry, wherein the packet processing circuitry is to indicate to the DTLS processing circuitry that the second packets are to bypass DTLS processing in the DTLS processing circuitry.

Still further in accordance with an embodiment of the present disclosure the packet processing circuitry is to identify the first packets for DTLS processing in the packet processing circuitry based on the first packets belonging to at least one first network flow, and identify the second packets to bypass DTLS processing in the packet processing circuitry and to be provided to the software to perform DTLS processing on the second packets based on the second packets belonging to at least one second network flow.

Additionally in accordance with an embodiment of the present disclosure the packet processing circuitry is to identify the first packets for DTLS processing in the packet processing circuitry based on the first packets supported by a first version of DTLS, and identify the second packets to bypass DTLS processing in the packet processing circuitry and to be provided to the software to perform DTLS processing on the second packets based on the second packets being supported by a second version of DTLS, different from the first version of DTLS.

Moreover, in accordance with an embodiment of the present disclosure the first packets and the second packets belong to a same network flow.

Further in accordance with an embodiment of the present disclosure the packet processing circuitry is configured to identify the first packets and the second packets based on header field content type of the first packet and the second packets.

Still further in accordance with an embodiment of the present disclosure the second packets are handshake packets.

Additionally in accordance with an embodiment of the present disclosure the second packets bypassing DTLS processing in the packet processing circuitry are packets encrypted by cryptographic material of a new cryptographic key epoch and processed by the packet processing circuitry prior to the cryptographic material of the new cryptographic key epoch being offloaded by the software to the networking device, and the first packets identified for DTLS processing in the packet processing circuitry are packets encrypted by the cryptographic material of the new cryptographic key epoch and processed by the packet processing circuitry after the cryptographic material of the new cryptographic key epoch has been offloaded by the software to the networking device.

Moreover, in accordance with an embodiment of the present disclosure the packet processing circuitry is to compare epoch fields in the DTLS headers of the packets against at least one valid epoch installed in the networking device to identify the second packets to bypass the DTLS processing and the first packets for DTLS processing in the packet processing circuitry.

There is also provided in accordance with another embodiment of the present disclosure, a method, including receiving network packets having headers including datagram transport layer security (DTLS) headers from a remote device over a packet data network, identifying first packets of the received packets for DTLS processing in packet processing circuitry, identifying second packets of the received packets to bypass DTLS processing in the packet processing circuitry and to be provided to software to perform DTLS processing on the second packets, performing DTLS processing on the first packets by the packet processing circuitry, providing the DTLS processed first packets to the software, and providing the second packets to the software to perform DTLS processing on the second packets.

Further in accordance with an embodiment of the present disclosure the performing the DTLS processing on the first packets includes finding at least one decryption key based on source and destination data of at least one DTLS header of the first packets, decrypting and authenticating the first packets based on the at least one decryption key, and performing replay protection checks based on DTLS sequence numbers of the first packets.

Still further in accordance with an embodiment of the present disclosure, the method includes performing DTLS processing by the software including finding at least one decryption key based on source and destination data of at least one DTLS header of the second packets, decrypting and authenticate the second packets based on the at least one decryption key, and performing replay protection checks based on DTLS sequence numbers of the second packets.

Additionally in accordance with an embodiment of the present disclosure, the method includes generating completion queue elements (CQEs) for the second packets indicating that the packets are being offloaded to the software to perform DTLS processing on the second packets.

Moreover, in accordance with an embodiment of the present disclosure, the method includes indicating to DTLS processing circuitry that the second packets are to bypass DTLS processing in the DTLS processing circuitry.

Further in accordance with an embodiment of the present disclosure, the method includes identifying the first packets for DTLS processing in the packet processing circuitry based on the first packets belonging to at least one first network flow, and identifying the second packets to bypass DTLS processing in the packet processing circuitry and to be provided to the software to perform DTLS processing on the second packets based on the second packets belonging to at least one second network flow.

Still further in accordance with an embodiment of the present disclosure, the method includes identifying the first packets for DTLS processing in the packet processing circuitry based on the first packets supported by a first version of DTLS, and identifying the second packets to bypass DTLS processing in the packet processing circuitry and to be provided to the software to perform DTLS processing on the second packets based on the second packets being supported by a second version of DTLS, different from the first version of DTLS.

Additionally in accordance with an embodiment of the present disclosure the first packets and the second packets belong to a same network flow.

Moreover, in accordance with an embodiment of the present disclosure, the method includes identifying the first packets and the second packets based on header field content type of the first packet and the second packets.

Further in accordance with an embodiment of the present disclosure the second packets are handshake packets.

Still further in accordance with an embodiment of the present disclosure the second packets bypassing DTLS processing in the packet processing circuitry are packets encrypted by cryptographic material of a new cryptographic key epoch and processed by the packet processing circuitry prior to the cryptographic material of the new cryptographic key epoch being offloaded by the software to the networking device, and the first packets identified for DTLS processing in the packet processing circuitry are packets encrypted by the cryptographic material of the new cryptographic key epoch and processed by the packet processing circuitry after the cryptographic material of the new cryptographic key epoch has been offloaded by the software to the networking device.

Additionally in accordance with an embodiment of the present disclosure, the method includes comparing epoch fields in the DTLS headers of the packets against at least one valid epoch installed in the networking device to identify the second packets to bypass the DTLS processing and the first packets for DTLS processing in the packet processing circuitry.

BRIEF DESCRIPTION OF THE DRAWINGS

The present disclosure will be understood from the following detailed description, taken in conjunction with the drawings in which:

FIGS. 17 and 18 are schematic views of packet processing based on epoch values in the system of FIG. 1.

DESCRIPTION OF EXAMPLE EMBODIMENTS

Overview

Figure 1:
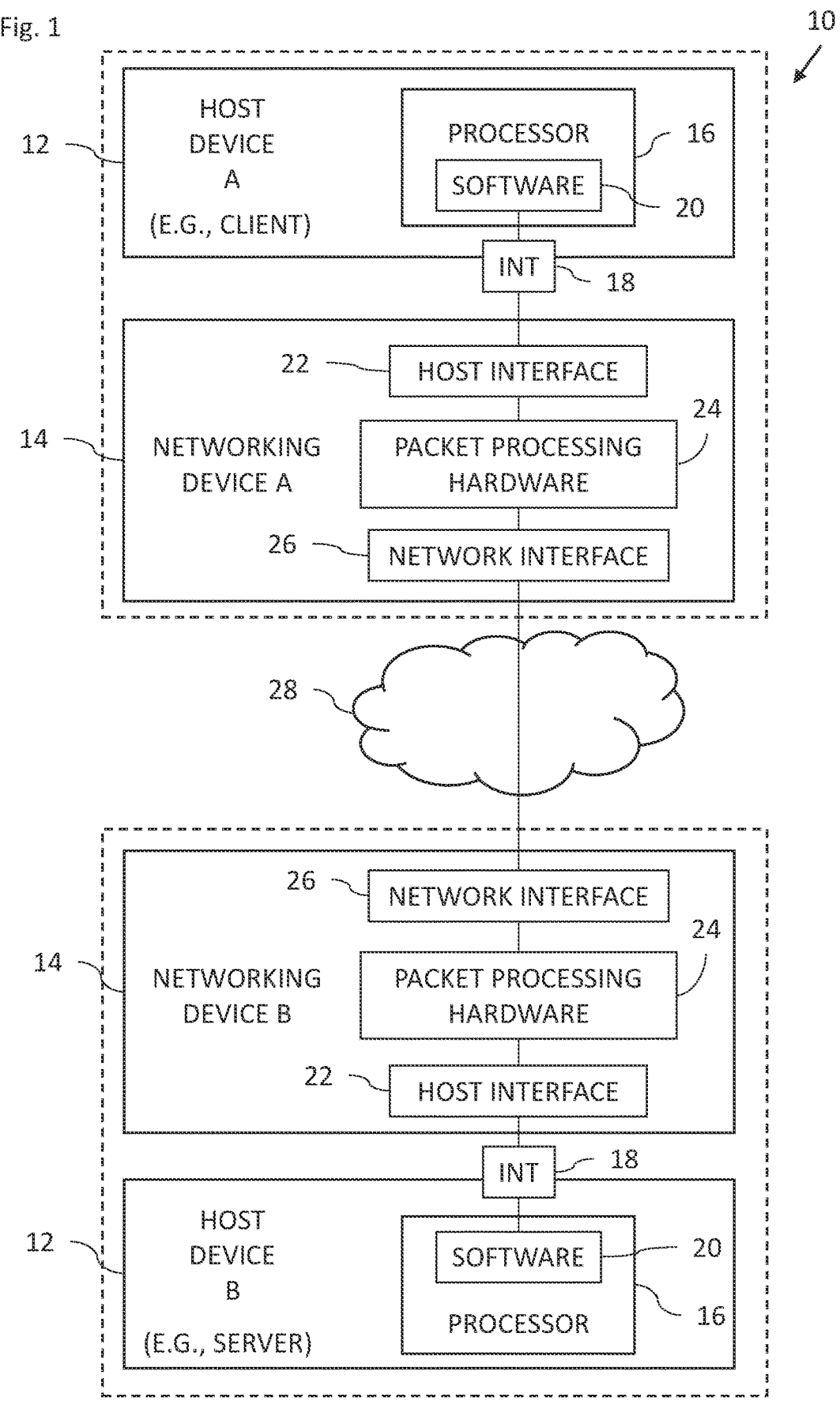
FIG. 1 is a block diagram view of secure communication system constructed and operative in accordance with an embodiment of the present disclosure.

It may be desirable, or even necessary in certain cases, to perform cryptographic operations in a networking device, such as a network interface controller (NIC). For example, remote direct memory access (RDMA) allows a host device to write directly to (or read directly from) the memory of a remote host device (i.e., over a network) via a remote NIC attached to the remote host device without having the operating system of the remote host device process the RDMA request. In such a case, the remote NIC needs to be able to decrypt/encrypt data before writing it to the host memory or decrypt/encrypt data read from the host memory for sending to the requesting host device. Therefore, there is a need for a NIC to perform cryptographic operations.

Embodiments of the present disclosure address at least some of the above drawbacks by providing a security layer protocol such as DTLS in a networking device (e.g., NIC). The DTLS connection is established by host devices and then security layer protocol functionality (such as DTLS functionality) is offloaded to networking devices attached to the host devices.

In some embodiments, the host devices set up a DTLS connection using a handshake which includes hello messages for example. DTLS sequence numbers are used as part of the handshake. The handshake also includes establishing cryptographic information (such as cryptographic key material) for use in secured communications. At this stage, the DTLS headers are generated by the host devices. Each host device offloads the cryptographic information to its network device (e.g., via the host memory) for use in secured communications between the network devices. The cryptographic information may be offloaded to the network devices by the respective host devices after finishing the handshake, or as part of finishing the handshake, as described in disclosed embodiments.

The network devices then communicate with each other, generate and process DTLS headers (instead of the host devices), and perform cryptographic operations (using the offloaded cryptographic information and optionally cryptographic information included in the DTLS headers) instead of the host devices. The network devices may perform any suitable action, for example, a RDMA read or write based on a received DTLS packet. The above may be performed using a standard DTLS protocol header for example.

New keys may be supplied to the network devices using a rekey process which operates via the host devices and the network devices, as described in disclosed embodiments. To operate efficiently certain changes and/or restrictions to the DTLS protocol are optionally implemented, as described in disclosed embodiments.

It was previously mentioned that the DTLS connection is established by host devices and then DTLS cryptographic information is offloaded to networking devices attached to the host devices, and then the networking devices perform DTLS functionality based on the offloaded cryptographic information. However, there may be some cases where it is desirable to process some network flows, or some packets in a network flow, in the host device instead of the networking device, thereby offloading part of the DTLS processing back to the software running on the host and referred to herein as a "software offload".

Therefore, embodiments of the present disclosure provide selective processing of DTLS packets in hardware of the networking device (referred to herein as "hardware offload") and selective processing of DTLS packets in software (e.g., running on the host device or on the networking device) (referred to herein as "software offload"). Software offload of a DTLS packet may include bypassing DTLS processing in the networking device and the networking device passing that DTLS packet (without changing the packet and packet header) to software (e.g., running on the host device or on the networking device) to perform DTLS processing such as decryption, authentication, and replay attack checking. Software offload may also include the networking device indicating to a next hardware block in the networking device that the DTLS packet for software offload is encrypted (and therefore should not be altered). The networking device may also indicate that the packet is for software offload in a completion queue element (CQE) for reading by the software so that software knows that it is receiving an encrypted packet and that the packet has not been altered.

Selective software offload may be useful in many scenarios.

For example, some of the network flows may be DTLS processed in the networking device and some of the network flows may be DTLS processed by the software. This may be used to lighten the DTLS processing load in the networking device, for example.

For example, if the hardware supports one version of DTLS, such as DTLS 1.2, but does not support another version of DTLS, such as DTLS 1.3, DTLS 1.2 packets may be processed in the networking device, whereas DTLS 1.3 packets may be software offloaded to the software, which supports processing of DTLS 1.3 packets.

For example, some control packets such as handshake packets and rekey packets which are generally processed by software (e.g., running on the host device or on the networking device), may be identified for software offload, and processed by the software without having to perform a special treatment of these packets in the networking device.

For example, some DTLS data packets may be received by the networking device prior to offload of cryptographic material by the software (e.g., running on the host device or on the networking device) to the networking device hardware being completed and therefore the networking device cannot process (e.g., decrypt) these DTLS data packets. Therefore, the networking device hardware may check for cryptographic material for the received packets, and if the cryptographic material cannot be found, the packets are software offloaded so that these packets are not dropped (e.g., prior to offload of the cryptographic material being completed).

Processing packets of a new cryptographic epoch is another example where software offload may be utilized. Cryptographic keys are refreshed periodically, e.g., each epoch. This is performed by software (e.g., running on the host devices or on the networking device). New cryptographic material for a new epoch is typically negotiated between software (e.g., running on host devices or on the networking devices) over the network and then the new cryptographic material is offloaded to the networking devices hardware by the software (e.g., running on the host devices or on the networking devices). It may occur that hardware of a first networking device starts encrypting some packets according to the new cryptographic material and sends the encrypted packets to a second networking device, prior to the second networking device hardware receiving offload of the new cryptographic material from the software (e.g., running on its local host device or on the networking device). Therefore, the packets encrypted with the new cryptographic material cannot be decrypted by the second networking device hardware and would otherwise be dropped by the second networking device hardware. Therefore, in some embodiments, DTLS packets received for a new epoch are software offloaded by the receiving networking device to be DTLS processed by software (e.g., running on the local host device or on the networking device) until cryptographic material for the new epoch is successfully offloaded by the software to the network device hardware.

In some embodiments, the networking device hardware compares the epoch included in the DTLS header of a received DTLS packet with a list of valid epochs (with cryptographic material offloaded to the networking device hardware) and software offloads the received packet to software (e.g., running on the host device or on the networking device) if the epoch included in the DTLS header of the received packet is not included in the list of valid epochs. Once the cryptographic material (e.g., key(s) is offloaded to the networking device hardware), the new epoch will be listed in list of valid epochs and the packets of the new epoch will be processed in hardware of the networking device.

System Description

Reference is now made to FIG. 1, which is a block diagram view of secure communication system 10 constructed and operative in accordance with an embodiment of the present disclosure.

The system 10 includes two host devices 12, and two networking devices 14 (e.g., NICs). The host devices 12 are referred to as host device A and host device B for simplicity of reference. Similarly, the networking devices 14 are referred to as networking device A and networking device B for simplicity of reference. Host device A may connect via networking device A, a packet data network 28, and networking device B to host device B.

Each host device 12 includes a processor 16 and an interface 18. The processor 16 is configured to run software 20. The interface 18 is configured to connect to a local one of the networking devices 14. Each networking device 14 includes a host interface 22, packet processing hardware 24, and a network interface 26. The host interface 22 is configured to connect to the local host device 12. The network interface 26 is configured to connect across the packet data network 28 to other devices.

The host devices 12 may be any suitable devices. In the example of FIG. 1 host device A is a client device and host device B is a server device. With respect to host device A, networking device A is a local networking device, while networking device B is a remote networking device, and host device B is a remote host device. With respect to host device B, networking device B is a local networking device, while networking device A is a remote networking device, and host device A is a remote host device. With respect to networking device A, host device A is a local host device, while networking device B is a remote networking device, and host device B is a remote host device. With respect to networking device B, host device B is a local host device, while networking device A is a remote networking device, and host device A is a remote host device. A remote device of a given device is defined as a device connected to the given device over the packet data network 28. A local device of a given device is defined as a host device of the given device or as a peripheral device of the given device and connected via a connection which is not a network connection.

The software 20 running on each host device 12 is configured to establish a DTLS connection with the remote host device 12 using a DTLS handshake and offload cryptographic material of the DTLS connection to its local networking device 14 as described in more detail with reference to FIGS. 5-7. The interface 18 of each host device 12 is configured to send or provide the cryptographic material to its local networking device 14. In other words, host device A offloads cryptographic material to networking device A, and host device B offloads cryptographic material to networking device B.

The host interface 22 of each networking device 14 is configured to receive packets from its local host device 12. The packet processing hardware 24 of each networking device 14 is configured to: receive the cryptographic material offloaded from its local host device 12 over the host interface 22; perform cryptographic operations (e.g., encryption) on the received packets based on the cryptographic material; generate DTLS headers including respective DTLS sequence numbers in hardware; and encapsulate the packets with the DTLS headers in hardware. The network interface 26 of each networking device 14 is configured to send the encapsulated packets with the DTLS headers to the remote networking device 14 over the packet data network 28. The packets may include remote direct memory access (RDMA) packets. The above is described in more detail with reference to FIG. 3.

In practice, some or all of the functions of the processor 16 may be combined in a single physical component or, alternatively, implemented using multiple physical components. These physical components may comprise hard-wired or programmable devices, or a combination of the two. In some embodiments, at least some of the functions of the processor 16 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Changes/Restrictions to the DTLS Protocol

As previously mentioned, for the networking devices 14 to operate efficiently certain changes and/or restrictions to the DTLS protocol may be applied. It should be noted that some of the changes and/or restrictions relate to DTLS headers and therefore the networking devices 14 preparing the DTLS headers apply the changes and/or restrictions. Whereas some of the changes and/or restrictions relate to the payload (e.g., records per packet and padding) and therefore the host devices 12 preparing the DTLS records apply the changes and/or restrictions.

The changes and/or restrictions may include one or more of the following:
1. Have a single DTLS record per packet (as opposed to one UDP payload including multiple DTLS records (messages) per packet). This may be done to avoid recirculating packets in hardware DTLS logic. If a packet with multiple records is received, hardware may identify it by comparing the UDP length to the DTLS message length and drop the packet. It is also possible to forgo the aforementioned check when the protocol provides a way to guarantee that the above will not occur, and in that case multi-record packets will be dropped based on authentication check, e.g., expecting the final authentication tag to match the whole packet and not just the last DTLS record in a packet.
2. Prohibit variable length padding. This may be done to simplify the lookup of the real DTLS record type. DTLS 1.3 introduced variable zero padding at the trailer that is processed sequentially to find the real DTLS record type. This sequential process increases latency.
3. DTLS record sequence numbers in the DTLS headers should remain in plaintext (i.e., not be in ciphertext).

DTLS 1.3 encrypts the record sequence number to reduce ossification and increase privacy. The processing of encrypted record sequence numbers requires an extra layer of encryption to be applied to the packet after the payload is encrypted. This extra encryption adds latency to packet processing. Since plaintext DTLS record sequence numbers are not supported by the first release of DTLS 1.3, an extension to the DTLS1.3 protocol is desirable to comply with the standard and avoid record sequence number encryption.

4. Use fixed length header fields. The DTLS1.3 standard allows peers to use variable length encoding to DTLS record header fields. Parsing variable length encoding in hardware match and action units is more costly in terms of memory and processing and should thus be avoided.

Therefore, the software 20 running on the processor 16 of each host device 12 may be configured to generate each packet (which will receive a DTLS header) with a single DTLS record. Similarly, the software 20 running on the processor 16 of each host device 12 may be configured to generate each packet (that will receive a DTLS header) with the same padding length. Each networking device 14 may be configured to keep the DTLS record sequence numbers in plaintext without encrypting the DTLS record sequence numbers, and/or use fixed length header fields for the DTLS headers.

Packet Formats and in/Outbound Processing

Figure 2A:
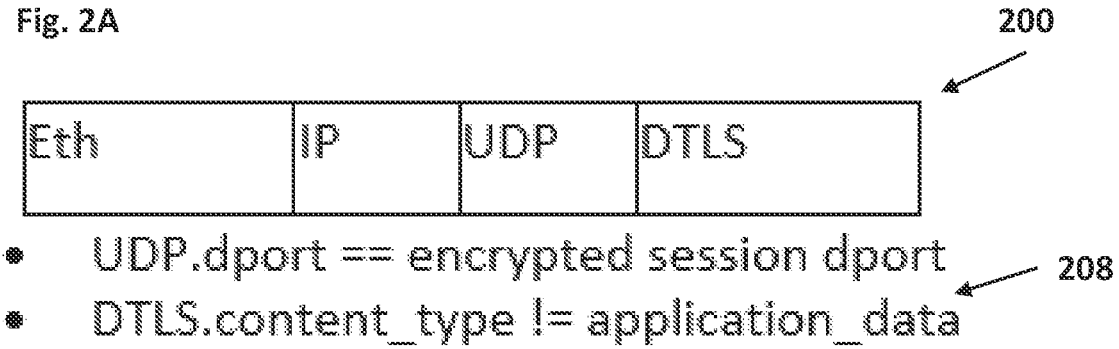
FIGS. 2A-D are views of packet formats and settings for use in the system of FIG. 1.
Figure 2B:
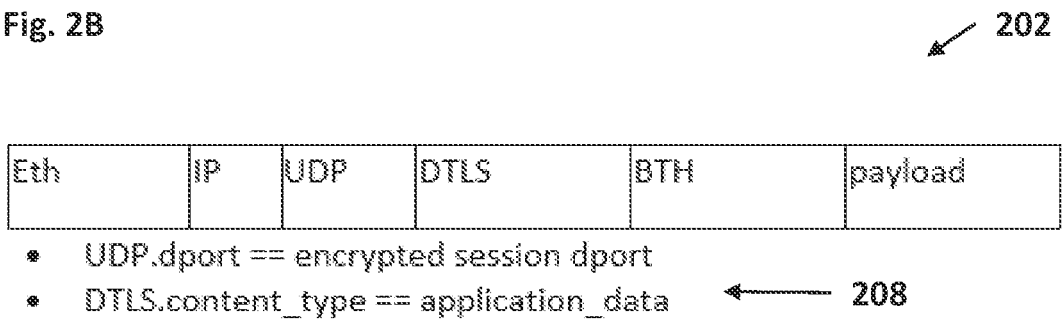
Figure 2C:
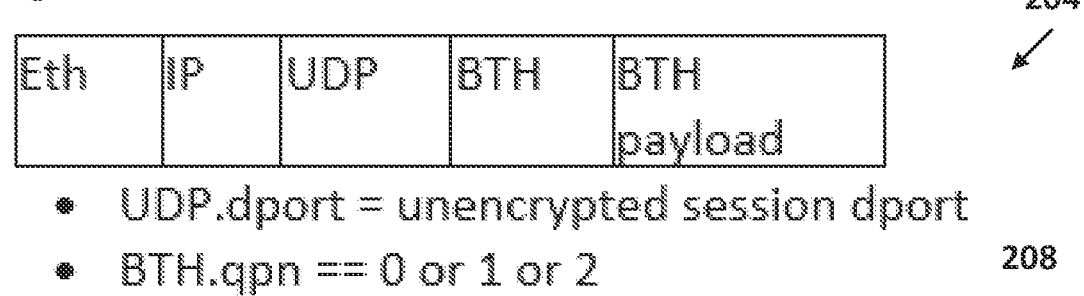
Figure 2D:
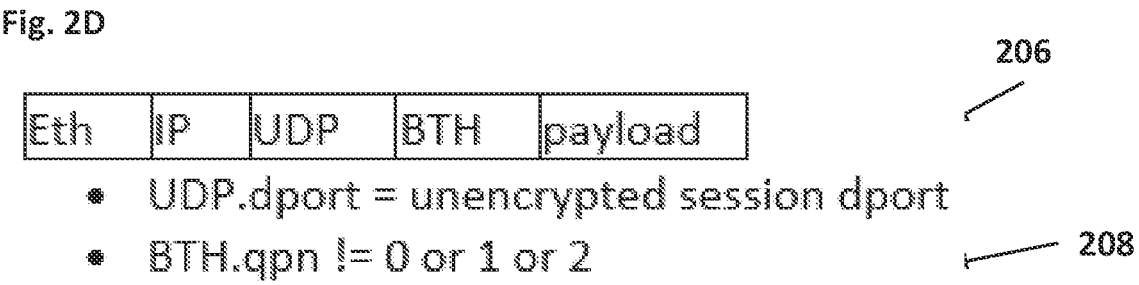

Reference is now made to FIGS. 2A-D, which are views of packet formats and settings 208 for use in the system of FIG. 1. FIG. 2A is a view of a control packet 200 when encryption is used. FIG. 2B is a view of a data packet 202 when encryption is used. FIG. 2C is a view of a non-encrypted control packet 204, and FIG. 2D is a view of a non-encrypted data packet 206. FIGS. 2A-D show the following: an Ethernet ("Eth") header; an IP header; a UDP header; a DTLS header; and a Base Transport Header (BTH); and payloads.

The system 10 provides two modes for encryption offload. One mode, "partial" offload includes offloading encryption and decryption to the networking devices 14, while "full" offload includes offloading encryption, decryption, replay protection, encapsulation, and decapsulation to the networking devices 14.

In some embodiments, the basic primitive to offload encryption resides in steering. Steering includes a series of programmable match and action operations that includes among others: packet encapsulation and decapsulation, header rewrite, counting packets/bytes, header push/pop, and selecting receive queue/core. With encryption, on both receive and transmit side, steering may encrypt/decrypt/authenticate packet payload using a key that is chosen based on parsed packet fields and/or work queue entry (WQE) metadata. Additionally, hardware may perform replay protection and sequence generation for packets going through steering. Steering is described in more detail with reference to FIGS. 3 and 4.

Full offload may be implemented for RDMA to process the encrypted BTH header. The main challenge with encryption of traffic is as follows: on the one hand, (de)encapsulation in the networking devices 14 is not always desirable, for instance, when the packet is a handshake message, the DTLS sequence number is used for reliable delivery (i.e., "ACK" records) and the software 20 needs to observe and use the DTLS sequence number; on the other hand, to guarantee replay protection all packets must update the replay protection bitmap in hardware in the networking devices 14.

Embodiments of the present disclosure address the above drawbacks by the packet processing hardware 24 in the networking devices 14 performing (de)encryption, replay protection, and sequence number generation even for DTLS handshake messages as described in more detail with reference to FIG. 4. The software 20 sending DTLS handshake messages receives the DTLS sequence number(s) used to send the relevant packets from the hardware of the networking devices 14. The DTLS sequence number may be provided by the networking device 14 reporting the sequence number in the completion notice of a processed packet (i.e., a notice generated when the packet is scattered to memory) or by querying hardware stored registers. The latter is generally slower.

Figure 3:
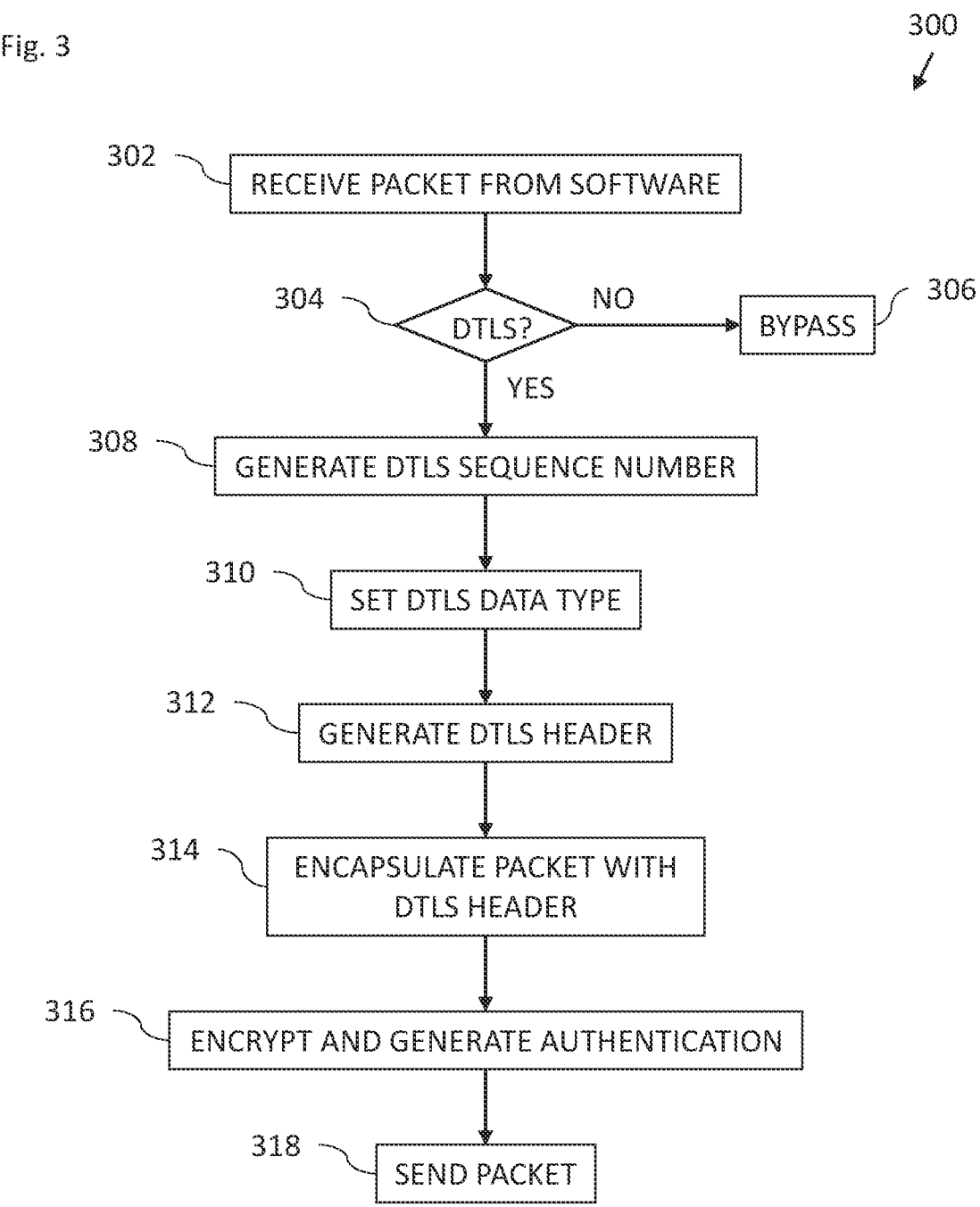
FIG. 3 is a flowchart including steps in a method of outbound packet processing in the system of FIG. 1.

Reference is now made to FIG. 3, which is a flowchart 300 including steps in a method of outbound packet processing in system 10 of FIG. 1. The packet processing hardware 24 of one of the networking devices 14 is configured to receive a packet from software 20 via the host interface 22 (block 302). The packet processing hardware 24 is configured to check at a decision block 304 if the packet is a DTLS packet. If the packet is not a DTLS packet, the DTLS processing shown in FIG. 3 is bypassed (block 306). If the packet is a DTLS packet, then the DTLS processing shown in FIG. 3 is performed in any suitable order. The packet processing hardware 24 is configured to generate a DTLS sequence number for the packet (block 308), set the DTLS data type to control packet or data packet accordingly (block 310), generate a DTLS header for the packet (block 312), encapsulate the packet with the generated DTLS header (block 314), and encrypt the packet and generate authentication data (i.e., to be used by a remote device to authenticate the packet data) (block 316). If a sequence number is generated for a control message, the packet processing hardware 24 is configured to write the generated sequence number to host memory and the software 20 may then query the host memory at a later stage to find the sequence number that was sent to another device.

The network interface 26 of the networking device 14 is configured to send the packet to the remote networking device 14 (block 318).

In some embodiments, the packet processing hardware 24 is configured to retain the DTLS sequence numbers of the packets to be sent in plaintext for sending to the remote networking device 14. In some embodiments, the packet processing hardware 24 is configured to generate header fields of the DTLS headers at a fixed length per header field (i.e., may use a different length for different header fields but not variable length for any one header field).

Figure 4:
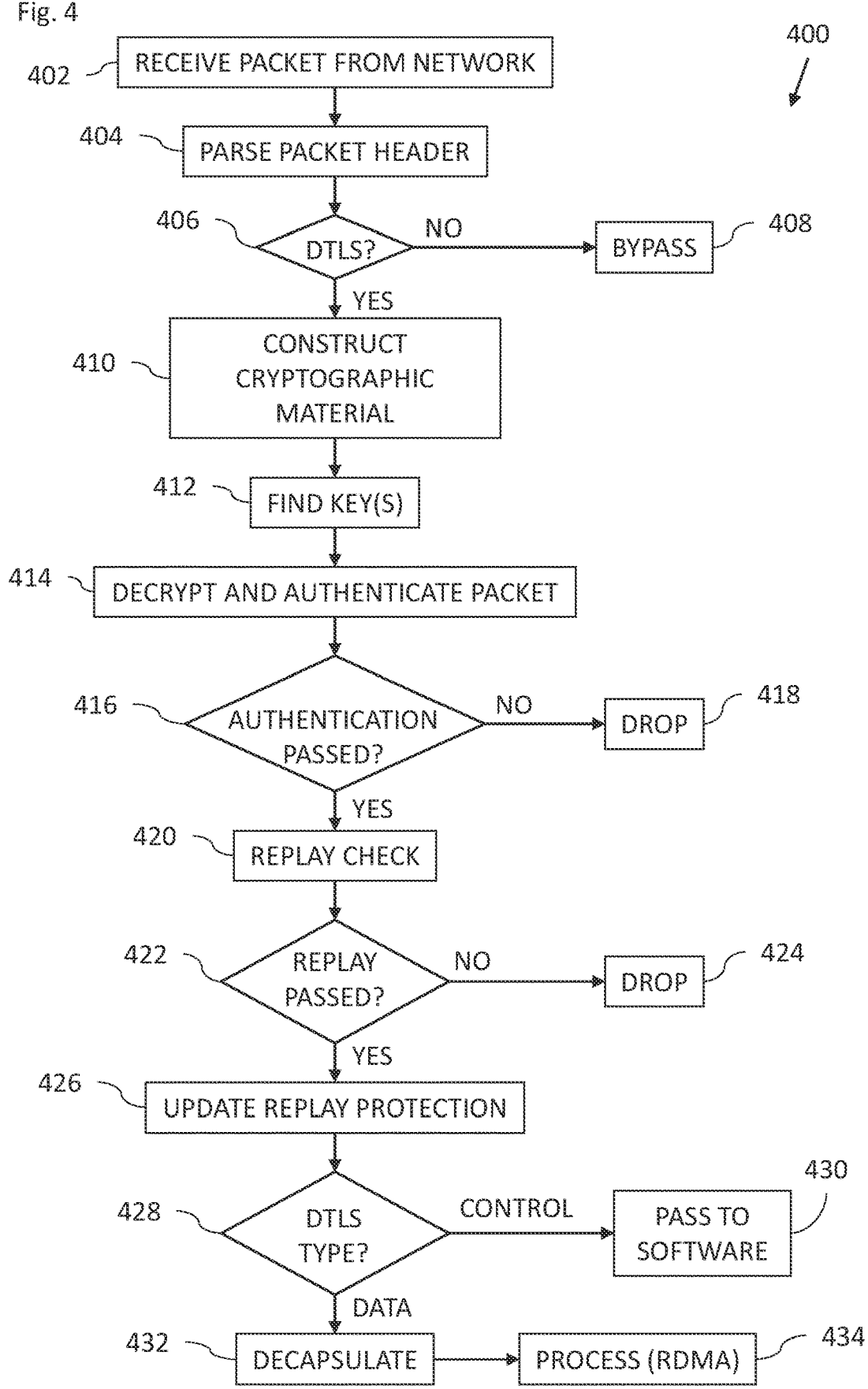
FIG. 4 is a flowchart including steps in a method of inbound packet processing in the system of FIG. 1.

Reference is now made to FIG. 4, which is a flowchart 400 including steps in a method of inbound packet processing in the system 10 of FIG. 1. The network interface 26 of one of the networking devices 14 is configured to receive from the remote networking device 14 over the packet data network 28 packets (at least some of which having headers including DTLS headers) (block 402). For each received packet the following processing is performed.

The packet processing hardware 24 is configured to parse the header of the received packet (block 404), and check at a decision block 406 if the packet is a DTLS packet. If the packet is not a DTLS packet, then the DTLS processing of FIG. 4 is bypassed (block 408). If the packet is a DTLS packet, then the DTLS processing of FIG. 4 is performed in any suitable order.

The packet processing hardware 24 is configured to construct cryptographic material (e.g., initialization vector and other data used in decryption and authentication) from the DTLS header of the received packet (block 410). The packet processing hardware 24 is configured to find one or more decryption keys in the constructed cryptographic material based on 5-tuple data (e.g., source and destination data in the DTLS header (block 412). The packet processing hardware 24 is configured to decrypt and authenticate the packet based on the decryption key(s) and the constructed cryptographic material (block 414). The packet processing hardware 24 checks if the authentication is verified at a decision block 416. If the authentication is not verified, the packet processing hardware 24 is configured to drop the packet (block 418). If the authentication is verified, the packet processing hardware 24 is configured to perform a replay protection check based on the DTLS sequence number of the packet (block 420). The packet processing hardware 24 checks if the replay protection check is successful at a decision block 422. If the replay check is unsuccessful, the packet processing hardware 24 is configured to drop the packet (block 424). If the replay check is successful, the packet processing hardware 24 is configured to update replay protection data with the DTLS sequence number of the packet (block 426). At a decision block 428, the packet processing hardware 24 is configured to check a DTLS data type of the packet. If the packet is a control packet, the packet processing hardware 24 is configured to pass the control packet to software 20 running on the local host device 12 (block 430). If the packet is a data packet, the packet processing hardware 24 is configured to decapsulate the data packet (block 432) and process the packet (block 434) such as perform a direct memory access operation of a host memory of the local host device 12 after decapsulating the data packet.

Races During Initialization

When switching to full offload from the host devices 12 to the networking devices 14 or to a new set of keys (i.e., rekey) with full offload, the software 20 software passes the state used for encryption and replay protection to hardware (i.e., the networking devices 14) for both receive and transmit processing. Software 20 should guarantee that no DTLS packet is sent or received between the time offload was requested and the time offload takes effect because such packets will be ignored by hardware and their replay may bypass hardware protection. For example, if offload has not yet occurred, the networking device 14 may erroneously forward RDMA packets to the local host device 12, and the local host device 12 will not know what to do with the RDMA packets. The description with reference to FIGS. 5-7 below describes different ways to address the above drawbacks.

Figure 5:
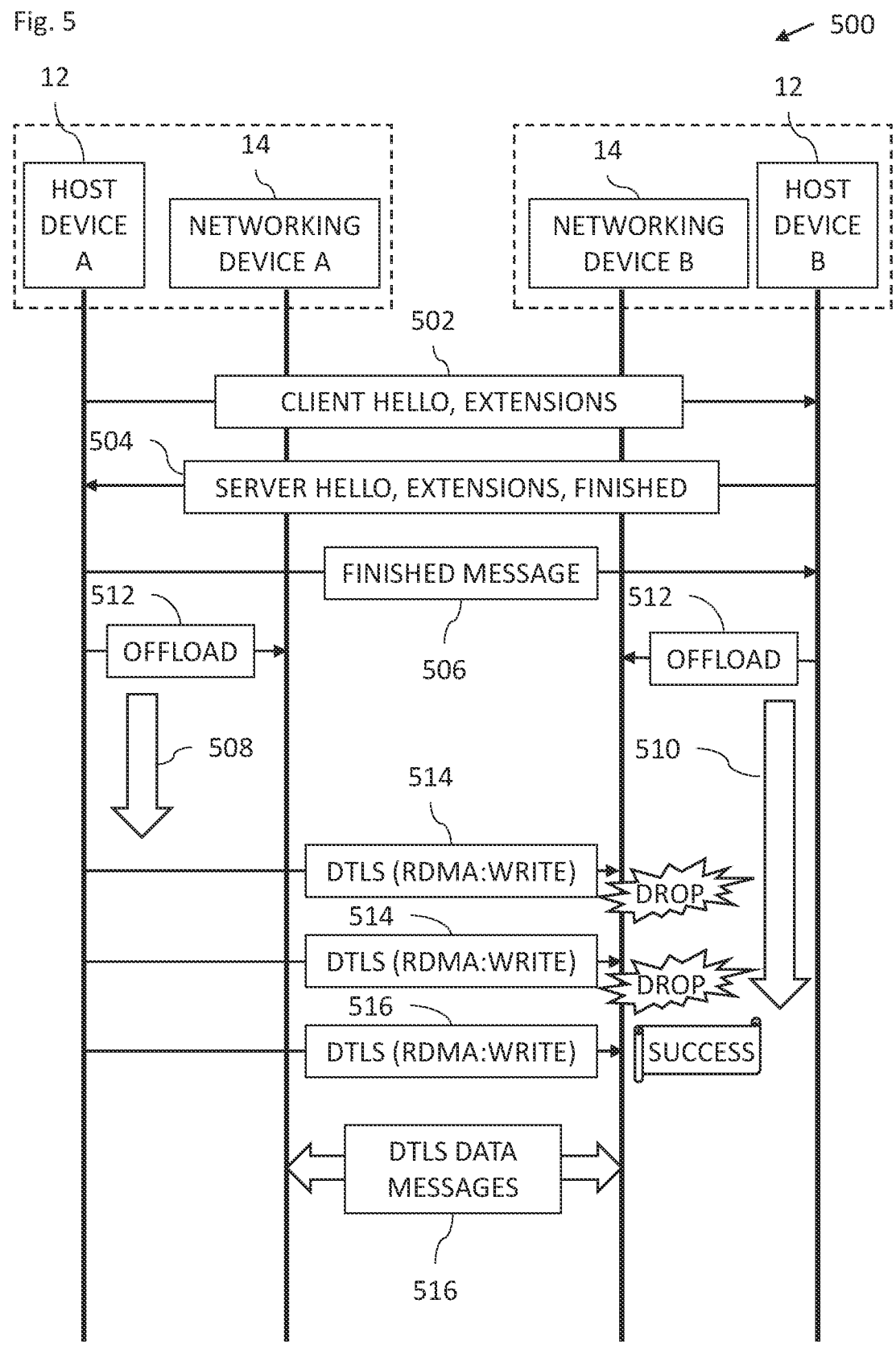
FIG. 5 is a flow diagram including steps in a first offload method in the system of FIG. 1.

Reference is now made to FIG. 5, which is a flow diagram 500 including steps in a first offload method in the system 10 of FIG. 1. In the method of FIG. 5, offload is performed after the DTLS handshake has completed. This leads to a race condition between a receiver networking device 14 being ready to receive DTLS packets and a sender networking device 14 sending packets. If packets are sent before the receiver networking device 14 is ready, drops will ensue. The receiver host device 12 configures its local networking device 14 to drop such DTLS packets before offload is completed. Once offload is completed the local networking devices 14 may process received DTLS packets.

Software 20 running on processor 16 of host device A is configured to send a client hello and extensions to host device B (block 502). Software 20 running on processor 16 of host device B is configured to perform a DTLS handshake with the remote host device (i.e., host device A) and sends a server hello, extensions, and a finished message (block 504). Software 20 running on processor 16 of host device B is configured to complete the DTLS handshake from its side. Prior to sending the finished message, the software 20 running on processor 16 of host device B is configured to provide an instruction to local networking device 14 (networking device B) to drop any DTLS packets received from remote networking device A prior to offload of cryptographic material from local host device B being completed. The packet processing hardware 24 of networking device B is configured to receive the instruction from the software 20 running on local host device B to drop any DTLS packets received from the remote networking device A prior to offload of the cryptographic material from the local host device B being completed. Software 20 running on processor 16 of host device A is configured to respond with a finished message (block 506).

Software 20 running on the processor 16 of both host device A and host device B is configured to offload cryptographic material to the respective local networking devices 14 (i.e., host device A to networking device A, and host device B to networking device B) after completing the DTLS handshake (blocks 512). FIG. 5 shows that the offload is completed from host device A to networking device A (see arrow 508) quicker than the offload is completed from host device B to networking device B (see arrow 510). Therefore, if host device A or networking device A starts sending DTLS messages to networking device B, prior to the offload being completed in networking device B, the packet processing hardware 24 of networking device B is configured to drop the DTLS packets received prior to completing offload of the cryptographic material from the local host device B (blocks 514). DTLS messages received after offload to networking device B is completed are successfully processed by the networking device B (blocks 516).

Figure 6:
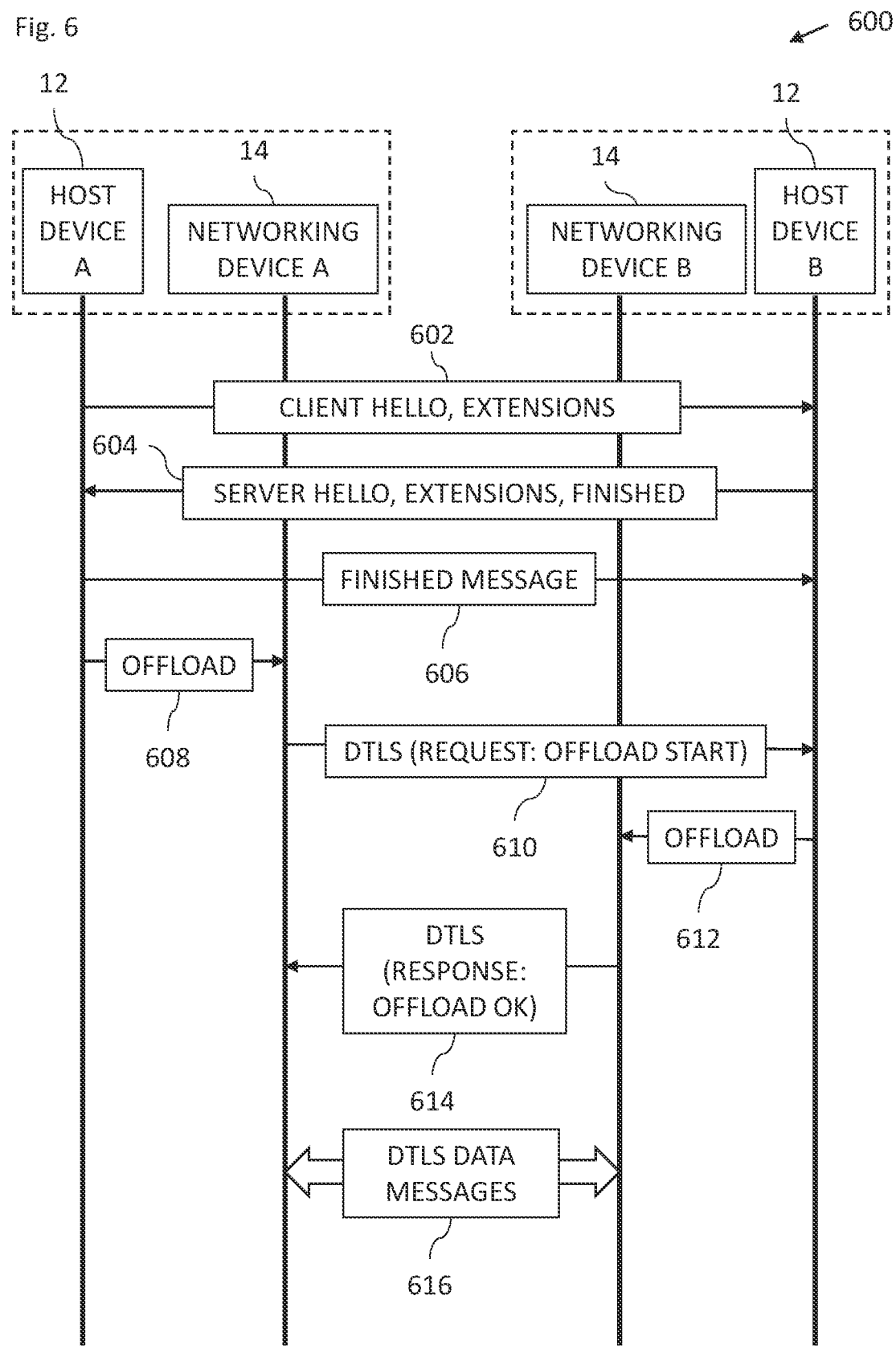
FIG. 6 is a flow diagram including steps in a second offload method in the system of FIG. 1.

Reference is now made to FIG. 6, which is a flow diagram 600 including steps in a second offload method in the system 10 of FIG. 1. In the method of FIG. 6 the handshake commences and finishes as usual. An application layer protocol above DTLS performs another handshake after offload to establish that hardware is ready, as described in more detail below. RDMA or similar processing is repressed until the offload is complete.

Software 20 running on processor 16 of host device A is configured to send a client hello and extensions to host device B (block 602). Software 20 running on processor 16 of host device B is configured to perform a DTLS handshake with the remote host device (i.e., host device A) and sends a server hello, extensions, and a finished message (block 604). Software 20 running on processor 16 of host device B is configured to complete the DTLS handshake from its side. Software 20 running on processor 16 of host device A is configured to respond with a finished message (block 606).

Software 20 running on processor 16 of host device A is configured to offload cryptographic material to local networking device A (block 608). In response to receiving the cryptographic material offloaded from the local host device A, the packet processing hardware 24 of networking device A is configured to generate a DTLS request 610 to remote host device B to commence offload of cryptographic material to remote networking device B. Software 20 running on processor 16 of host device B is configured to receive the DTLS request 610 generated by remote networking device A requesting to commence offload of cryptographic material to local networking device B. In response to receiving the DTLS request 610, software 20 running on processor 16 of host device B is configured to offload cryptographic material to local networking device B (block 612).

The packet processing hardware 24 of networking device B is configured to generate a DTLS response 614 to remote networking device A indicating that the offload of cryptographic material to local networking device B has been completed. The packet processing hardware 24 of networking device A is configured to receive the DTLS response 614 from remote networking device B that the cryptographic material has been offloaded to remote networking device B by remote host device B. In response to receiving the DTLS response 614, the packet processing hardware 24 of networking device A is configured to commence sending DTLS data messages to remote networking device B (block 616).

Figure 7:
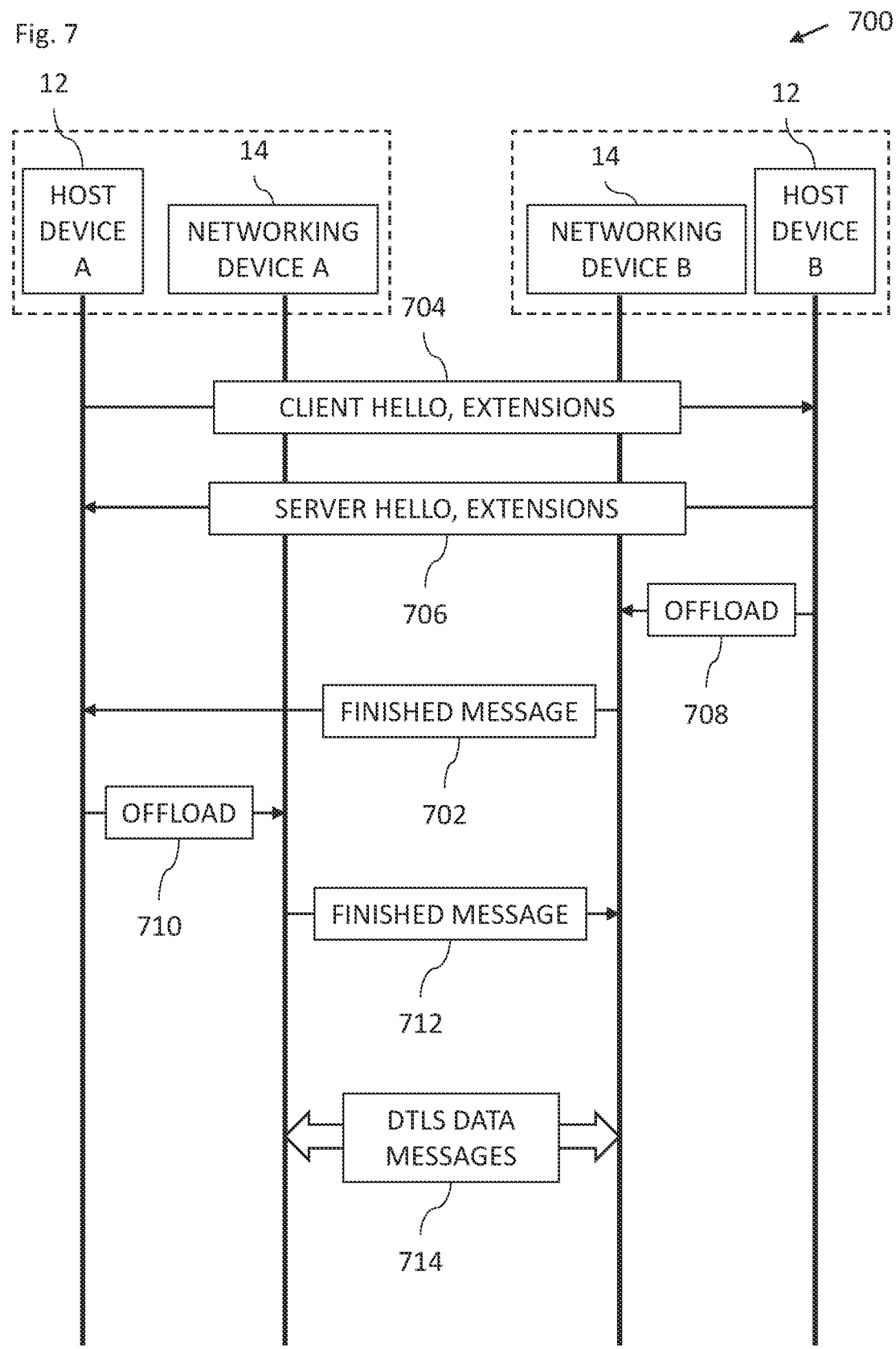
FIG. 7 is a flow diagram including steps in a third offload method in the system of FIG. 1.

Reference is now made to FIG. 7, which is a flow diagram 700 including steps in a third offload method in the system 100 of FIG. 1. In the method of FIG. 7, the offload by the host devices 12 to the networking devices 14 forms part of the initialization handshake between the host devices 12 such that the handshake cannot make progress while offload is being set. Therefore, each respective host device 12 completes offload to its local networking device 14 before sending the "Finished" handshake message. Software 20 running on one of the host devices 12 relies on full offload to the local networking device 14 to build the DTLS record and set the sequence for sending the Finished message to the remote networking device 14.

Software 20 running on processor 16 of host device A is configured to send a client hello and extensions to host device B (block 704). Software 20 running on processor 16 of host device B is configured to send a server hello and extensions to host device A (block 706). Software 20 running on processor 16 of host device B is configured to offload cryptographic material to its local networking device B (block 708). The packet processing hardware 24 of networking device B is configured, in response to receiving the offload of the cryptographic material from the local host device B, to generate a DTLS finished message 702 and send the DTLS finished message 702 to remote host device A.

Software 20 running on processor 16 of host device A is configured to receive DTLS finished message 702 from remote host device B, and offload cryptographic material to local networking device A (block 710). The packet processing hardware 24 of networking device A is configured to generate a DTLS finished message 712 (in response to completing the offload of cryptographic material to networking device A) and send DTLS finished message 712 to remote networking device B. The packet processing hardware 24 of networking device B is configured to receive the DTLS finished message 712 indicating that the offload of cryptographic material to networking device A has been completed. The packet processing hardware 24 of networking device A is configured to commence sending DTLS data messages to networking device B (block 714).

Figure 8:
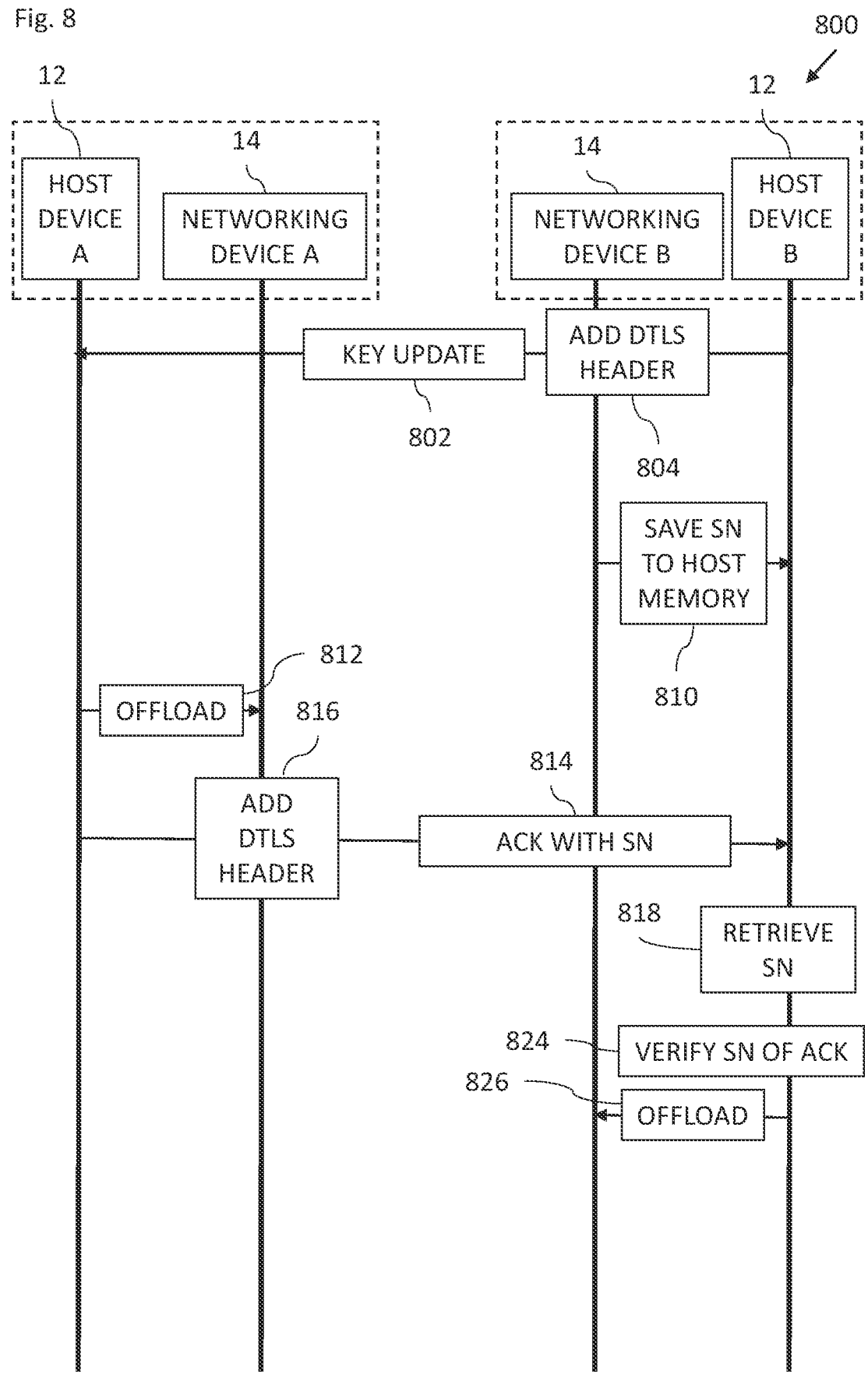
FIG. 8 is a flow diagram including steps in a rekey method in the system of FIG. 1.

Reference is now made to FIG. 8, which is a flow diagram 800 including steps in a rekey method in the system 10 of FIG. 1. If new keys are needed in the middle of processing (e.g., in the middle of processing RDMA) after initial keys have been established, new keys can be negotiated between server and client using a key update message and acknowledgment. The rekeying is performed on the same connection as the RDMA processing. The headers of the key update and acknowledgment messages are handled in the networking devices 14 while the negotiation of the new key(s) is performed by the software 20 in the host devices 12.

In general, the packet processing hardware 24 on each host device 12 is configured to process DTLS control messages associated with rekey processing to update old cryptographic material with new cryptographic material as described in more detail below. Software 20 running on the processor 16 of host device B (e.g., a server) is configured to generate a DTLS control message as a key update message 802 and provide the key update message 802 to local networking device B.

The packet processing hardware 24 of networking device B is configured to receive the key update message 802 from local host device B and add a DTLS header to key update message 802 in hardware (block 804). The networking device B generates the DTLS sequence number to be included in the DTLS header. The DTLS sequence number is needed later in the rekey process by host device B (the server) to process the acknowledgement message from host device A (the client). Therefore, in some embodiments, the packet processing hardware 24 of networking device B saves the DTLS sequence number to memory of host device B (block 810) for later retrieval by software 20 running on host device B as described in more detail below. The packet processing hardware 24 of networking device B is configured to send key update message 802 with the DTLS header to remote host device A.

The packet processing hardware 24 of networking device A is configured to receive key update message 802 from host and networking device B, process key update message 802 according to the method described above with reference to FIG. 4, and provide key update message 802 (including the DTLS header of key update message 802) to software 20 running on processor 16 of local host device A.

Software 20 running on the processor 16 of host device A is configured to receive key update message 802 from the local networking device A, offload new cryptographic material (e.g., receiver keys) to local networking device A (block 812), generate a DTLS control message as an acknowledgement message 814 of the key update message 802 including the DTLS sequence number of the key update message 802, and provide the acknowledgement message 814 to the local networking device A for sending to host device B.

The packet processing hardware 24 of networking device A is configured to receive acknowledgement message 814, add a DTLS header to acknowledgement message 814 (block 816), and send acknowledgement message 814 with the DTLS header to remote networking device B.

The packet processing hardware 24 of networking device B is configured to receive acknowledgement message 814 from host and networking device A, process acknowledgement message 814 according to the method described above with reference to FIG. 4, and provide acknowledgement message 814 (including the DTLS header of acknowledgement message 814) to software 20 running on processor 16 of local host device B.

Software 20 running on the processor 16 of the local host device is configured to receive the acknowledgement message 814 from the local networking device B, and retrieve the DTLS sequence number of the key update message 802 from the host memory of host device B (block 818). It should be noted that the step of block 818 may be performed prior to receiving acknowledgement message 814.

Software 20 running on the processor 16 of host device B is configured to verify that the DTLS sequence number of the key update message 802 corresponds with the DTLS sequence number of the acknowledgement message 814 (block 824), and offload the new cryptographic material to local networking device B responsively (i.e. in response to)

to verifying that the DTLS sequence number of the key update message 802 corresponds with the DTLS sequence number of the acknowledgement message 814 (block 826).

In some embodiments, the old cryptographic material remains in the packet processing hardware 24 for a predetermined period of time, and/or until some preconfigured number of packets using the new cryptographic material are processed by the packet processing hardware 24.

Figure 9:
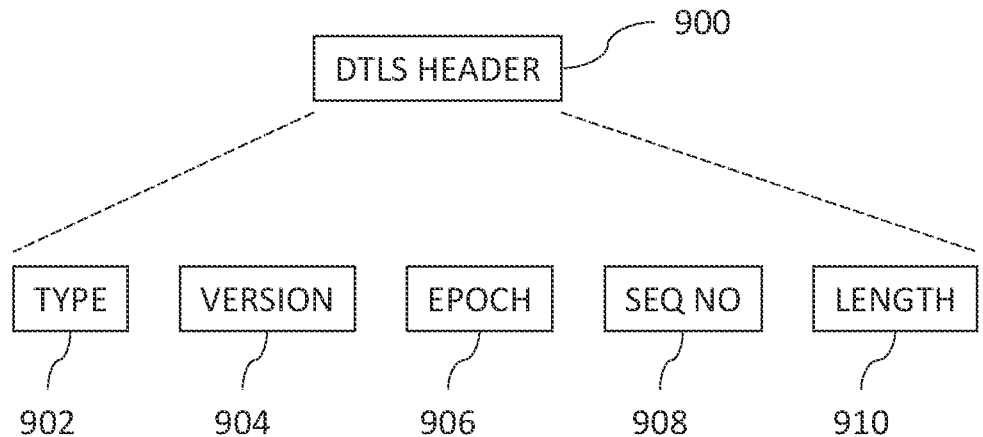
FIG. 9 is a view of a DTLS header for use in the system of FIG. 1.

Reference is now made to FIG. 9, which is a view of a DTLS header 900 of a packet (not shown) for use in the system 10 of FIG. 1. The DTLS header 900 may include the following fields: type 902; version 904; epoch 906; sequence number 908 and length 910. The type 902 may indicate the type of packet, e.g., application data packet or control packet. The version 904 provides the DTLS version according to which the DTLS packet was generated, for example, DTLS 1.2 or DTLS 1.3. The epoch 906 indicates the cryptographic epoch defining cryptographic material used to encrypt the packet. The sequence number 908 provides a unique DTLS sequence number and may be used in replay protection window, in which packets with sequence numbers below the window are dropped and repeat packets are dropped based on a bitmap window of received records. The sequence numbers may also help the encryption to be record-based and allow the packets to be decrypted independently. The length 910 provides the length of the DTLS record, which in some embodiments does not exceed one packet.

Figure 10:
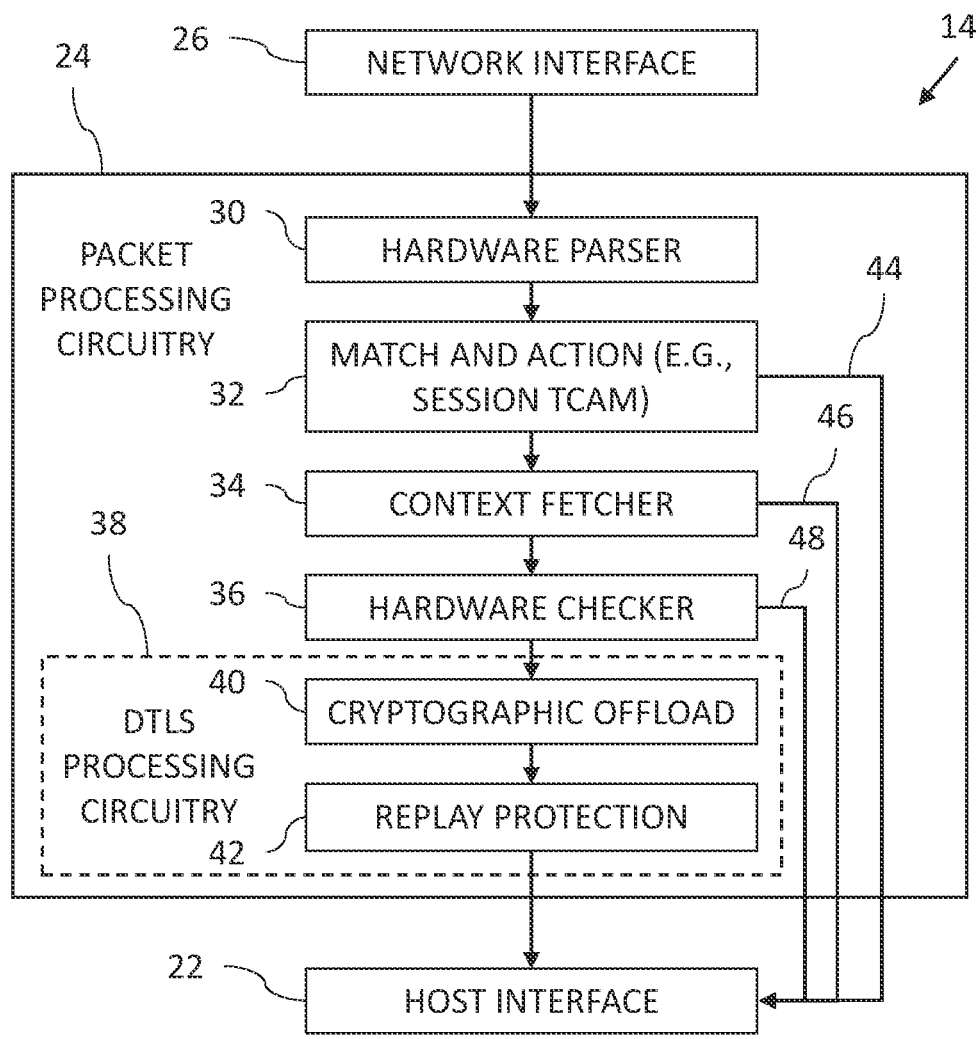
FIG. 10 is a block diagram view showing details of a networking device in the system of FIG. 1.

Reference is now made to FIG. 10, which is a block diagram view showing details of the networking device 14 in the system 10 of FIG. 1. The network interface 26 is configured to receive packets from the network and provide them to packet processing hardware 24. The packet processing hardware 24 processes the received packets and in some embodiments provides them to the host interface 22 to provide to the host device 12 connected to the networking device 14.

The packet processing hardware 24 includes various elements, some of which are shown in FIG. 10. The packet processing hardware 24 includes a hardware parser 30, a match-and-action engine 32, a context fetcher 34, a hardware checker 36, and DTLS processing circuitry 38, which includes a cryptographic offload engine 40, and a replay protection engine 42.

The hardware parser 30 is configured to parse the headers of a received packet. Received packets may be plaintext or encrypted. Some plaintext packets are dropped whereas other may be forwarded to software 20 for processing. The hardware parser 30 is configured to attempt to speculatively parse a DTLS header of the packet as it is unknown which packet has a DTLS header at this point in the packet processing. The match-and-action engine 32 (e.g., session Ternary Content Addressable Memory (TCAM)) matches values of fields (e.g., 5-tuple values, such as source IP address/port number, destination IP address/port number and the protocol in use), in the parsed header(s) to values in one or more match-and-action tables to determine how to process the received packet and determine whether the packet includes the DTLS header 900. Once the packet has been identified as including the DTLS header 900, DTLS header fields such as type 902, version 904, epoch 906, sequence number 908, and length 910 may be extracted for use in determining further actions or used in other sections of the packet processing hardware 24. For example, if the type 902 is a control packet, the packet may be directed to software offload and bypass (arrow 44) DTLS processing in the DTLS processing circuitry 38. The match-and-action engine 32 may determine that the packet should be dropped or continue to the context fetcher 34, which is configured to fetch cryptographic information such as key(s), initialization vector(s) and other security information based on the value of the epoch 906 retrieved from the DTLS header 900. If the value of the epoch 906 retrieved from the DTLS header 900 is not included in a list of epochs stored by the networking device 14, then the packet may be dropped or the packet may be directed to software offload and bypass (arrow 46) DTLS processing in the DTLS processing circuitry 38.

The hardware checker 36 is configured to perform checks such as checking the value of the version 904 of DTLS included in the DTLS header 900 and perform other checks, such as validating lengths of various sections of the packet. The hardware checker 36 may determine that the packet processing hardware 24 does not support processing the DTLS version indicated in the version 904 of the DTLS header 900, and the packet may be directed to software offload and bypass (arrow 48) DTLS processing in the DTLS processing circuitry 38.

If the packet is a DTLS packet for an epoch known to the networking device 14, and for a version of DTLS processed by the packet processing hardware 24, the DTLS processing circuitry 38 performs DTLS processing on the packet including the cryptographic offload engine 40 being configured to decrypt the packet using cryptographic information retrieved based on the epoch 906 and authenticate the packet, and the replay protection engine 42 being configured to perform a replay protection check including fetching the replay window and updating a list of received packets using the sequence number 908 of the packet.

If the packet is not a DTLS packet or otherwise bypasses DTLS processing in the DTLS processing circuitry 38, the packet is provided to the host interface 22 for providing to the local host device 12.

Software offload of a DTLS packet may include bypassing DTLS processing in the networking device 14 and the networking device 14 passing that DTLS packet (without changing the packet and packet header) to software 20 (running on the host device 12 or on the networking device 14) to perform DTLS processing such as decryption, authentication, and replay attack checking. Software offload may also include the networking device 14 indicating to a next hardware block (e.g., the DTLS processing circuitry 38) in the networking device 14 that the DTLS packet for software offload is encrypted (and therefore should not be altered). The networking device 14 may also generate a completion queue element (CQE) and indicate in the CQE that the packet is for software offload so that software 20 (running on the host device 12 or on the networking device 14) knows that it is receiving an encrypted packet and that the packet has not been altered. CQEs may be generated for all packets, with each CQE indicating whether the packet is a DTLS packet or not, whether the packet was hardware offloaded or has been software offloaded, whether an error occurred in processing the packet.

Figure 11:
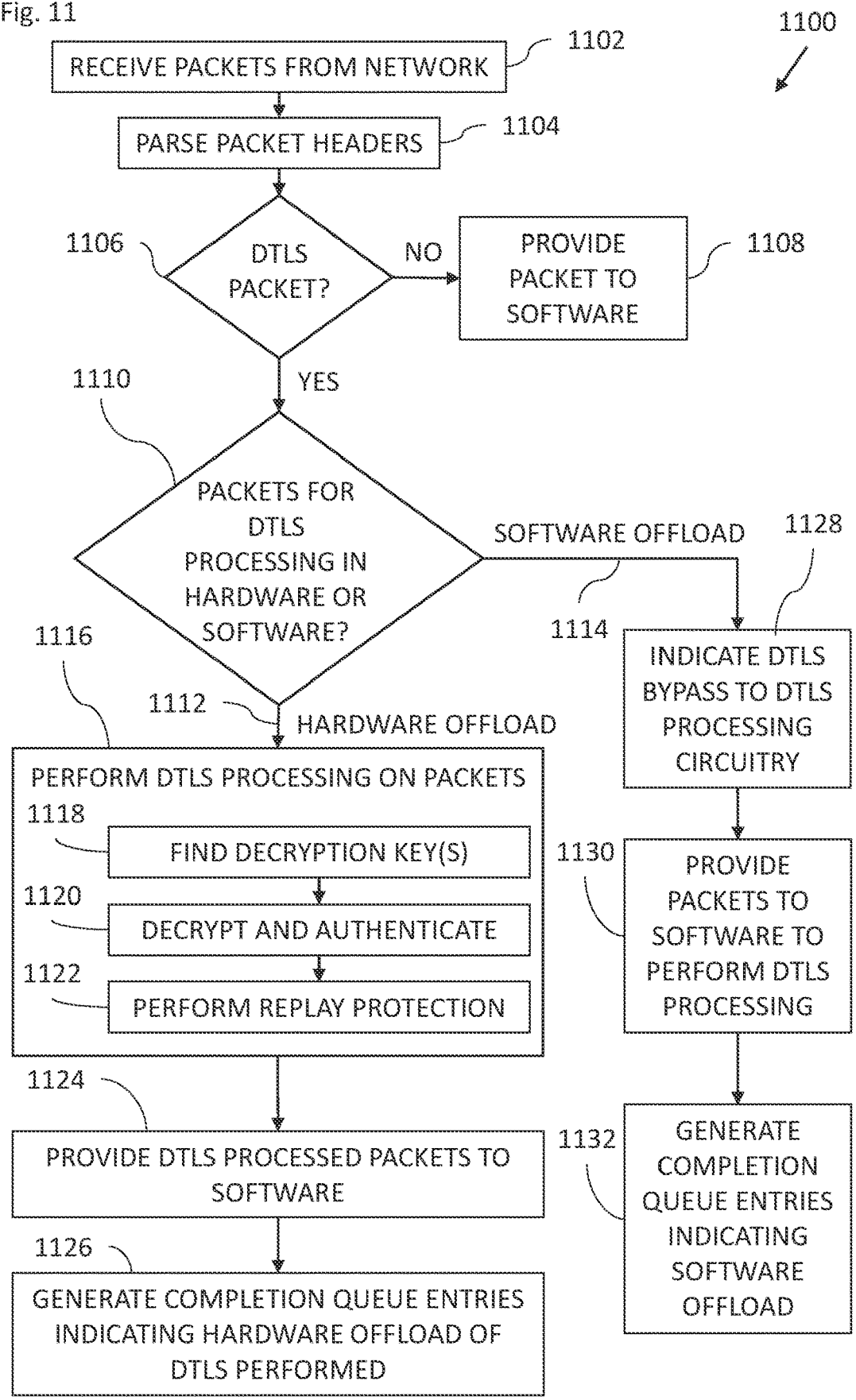
FIG. 11 is a flowchart including steps in a method of processing received packets selectively deciding to perform hardware or software offload in the networking device of FIG. 10.

Reference is now made to FIG. 11, which is a flowchart 1100 including steps in a method of processing received packets and selectively deciding to perform hardware or software offload in the networking device 14 of FIG. 10. Reference is also made to FIG. 10. The network interface 26 is configured to receive network packets having headers including datagram transport layer security (DTLS) headers from a remote device over the packet data network 28 (block 1102). The hardware parser 30 of the packet processing hardware 24 is configured to parse the headers of the received packets (block 1104).

At a decision block 1106, the match-and-action engine 32 of the packet processing hardware 24 is configured to identify if a packet is a DTLS packet or not (for example based on header fields such as 5-tuple fields). If a packet is not a DTLS packet, then that packet bypasses DTLS processing and is provided to the software 20 for processing (block 1108) after any other packet processing performed by the packet processing hardware 24. If the packet is a DTLS packet, then that packet is provided to the next stage of the method at a decision block 1110.

At decision block 1110, the packet processing hardware 24 is configured to identify first packets of the received packets for DTLS processing in the packet processing circuitry 24 (branch 1112); and identify second packets of the received packets to bypass DTLS processing in the packet processing circuitry 24 (branch 1114) and to be provided to software 20 to perform DTLS processing on the second packets, as described in more detail with reference to FIG. 12. In some cases, the first packets may be in a different network flow or flows than the second packets. In some cases, at least some of the first packets and at least some of the second packets may be in the same network flow. The identification of whether packets should be software offloaded or hardware offloaded may be performed by the match-and-action engine 32, the context fetcher 34, and/or the hardware checker 36, as described in more detail with reference to FIGS. 13-16.

For packets identified as first packets for DTLS processing in the packet processing circuitry 24, the DTLS processing circuitry 38 of the packet processing hardware 24 is configured to perform DTLS processing on the first packets (block 1116). As part of the step of block 1116, the context fetcher 34 of the packet processing hardware 24 is configured to find one or more decryption keys based on source and destination data of one or more DTLS headers of the first packets (block 1118), the cryptographic offload engine 40 of the packet processing hardware 24 is configured to decrypt and authenticate the first packets based on the decryption key(s) (block 1120), and the replay protection engine 42 of the packet processing hardware 24 is configured to perform replay protection checks based on DTLS sequence numbers of the first packets (block 1122).

The packet processing hardware 24 is configured to provide the packets to the host interface 22, and the host interface 22 is configured to provide the DTLS processed first packets to the software 20 (block 1124), for example, by scattering the first packets to host memory as indicated by work queue elements (WQEs) associated with the first packets. In some embodiments, the software 20 may be running on a processor in the networking device 14. The packet processing hardware 24 is configured to generate completion queue elements (CQEs) for the first packets indicating that the first packets have been DTLS processed in the packet processing hardware 24 (block 1126).

For packets identified as second packets to bypass DTLS processing in the packet processing circuitry 24, the packet processing circuitry 24 is configured to indicate to the DTLS processing circuitry 38 that the second packets are to bypass DTLS processing in the DTLS processing circuitry 38 (block 1128). The packet processing hardware 24 is configured to provide the second packets to the host interface 22, which is configured to provide the second packets to the software 20 to perform DTLS processing on the second packets (block 1130), as described in more detail with reference to FIG. 12. The packet processing hardware 24 is configured to generate completion queue elements (CQEs) for the second packets indicating that the second packets are being offloaded to the software 20 to perform DTLS processing on the second packets (block 1132). If the software 20 is running on the networking device 12, then the CQEs may include any suitable notification to software 20.

Figure 12:
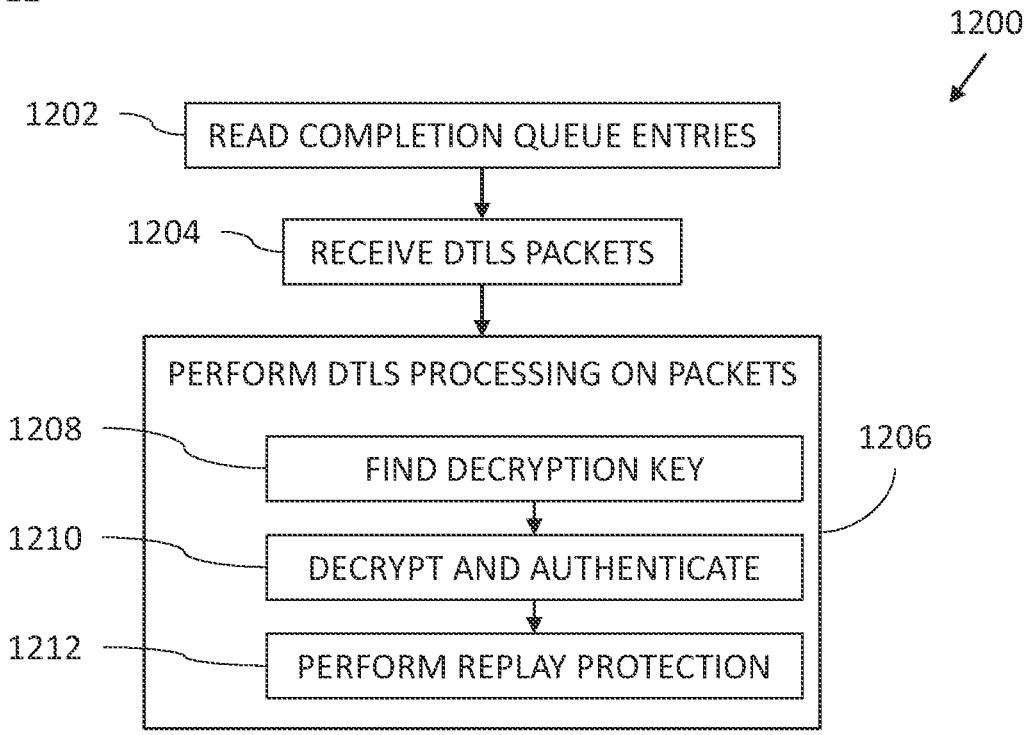
FIG. 12 is a flowchart including steps in a method of DTLS processing in a host device of FIG. 1.

Reference is now made to FIG. 12, which is a flowchart 1200 including steps in a method of DTLS processing in the host device 12 of FIG. 1. The software 20 is configured to read the CQEs from a completion queue to find the location in memory of packets associated with the packets (block 1202) and other data about the packets. Based on the CQEs, the software 20 is configured to retrieve and receive the packets including the second packets (which are DTLS packets still including the DTLS headers and still encrypted) from memory (block 1204). The software 20 is configured to perform DTLS processing on the second packets (block 1206). The step of block 1206 may include the software 20 being configured to: find one or more decryption keys based on source and destination data of one or more DTLS headers of the second packets (block 1208); decrypt and authenticate the second packets based on the decryption key(s) (block 1210); and perform replay protection checks based on DTLS sequence numbers of the second packets (block 1212).

Reference is now made to FIGS. 13-16, which are flowcharts including steps in checking sub-methods performed as part of the method of FIG. 11.

Figure 13:
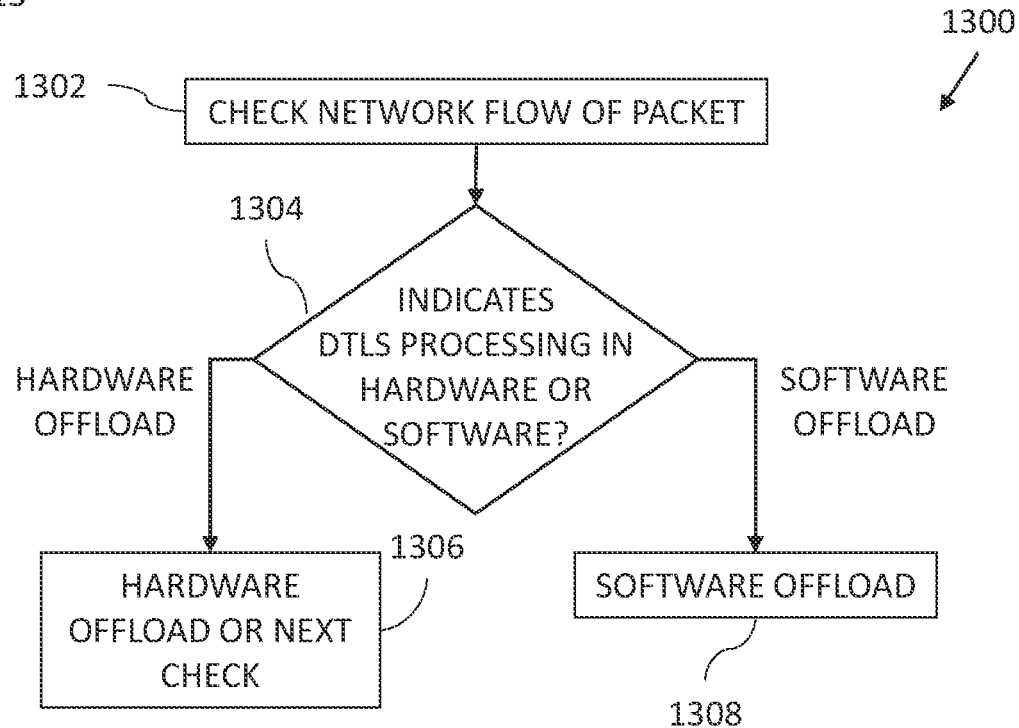
FIGS. 13-16 are flowcharts including steps in checking sub-methods performed as part of the method of FIG. 11.

Reference is now made to FIG. 13, which is a flowchart 1300 including steps in a sub-method to check network flow. For example, some of the network flows may be DTLS processed in the networking device 14 and some of the network flows may be DTLS processed by the software 20. This may be used to lighten the DTLS processing load in the network device 14, for example.

The match-and-action engine 32 of the packet processing hardware 24 is configured to check the network flow of a packet based on values of header fields (e.g., 5-tuple values) (block 1302). The network flow may be associated with hardware offload or software offload and the match-and-action tables may be configured to provide a "hardware offload" action for some network flows, and a "software offload" for some network flows. At a decision block 1304, the match-and-action engine 32 of the packet processing circuitry is configured to identify first packets for DTLS processing in the DTLS processing circuitry 38 based on the first packets belonging to a given network flow or flows; and identify second packets to bypass DTLS processing in the DTLS processing circuitry 38 and to be provided to the software 24 to perform DTLS processing on the second packets based on the second packets belonging to a different network flow or flows. The first packets proceed to hardware offload or are subject to an additional check by the packet processing hardware 24 (block 1306). The second packets proceed to software offload and bypass DTLS processing in the DTLS processing circuitry 38 (block 1308).

It should be noted that packets described above as "first" packets identified for DTLS processing in the DTLS processing circuitry 38 may undergo one or more further checks, for example, one or more of the checks described with reference to FIGS. 14-16, and then be reclassified as "second" packets for software offload based on various criteria.

Figure 14:
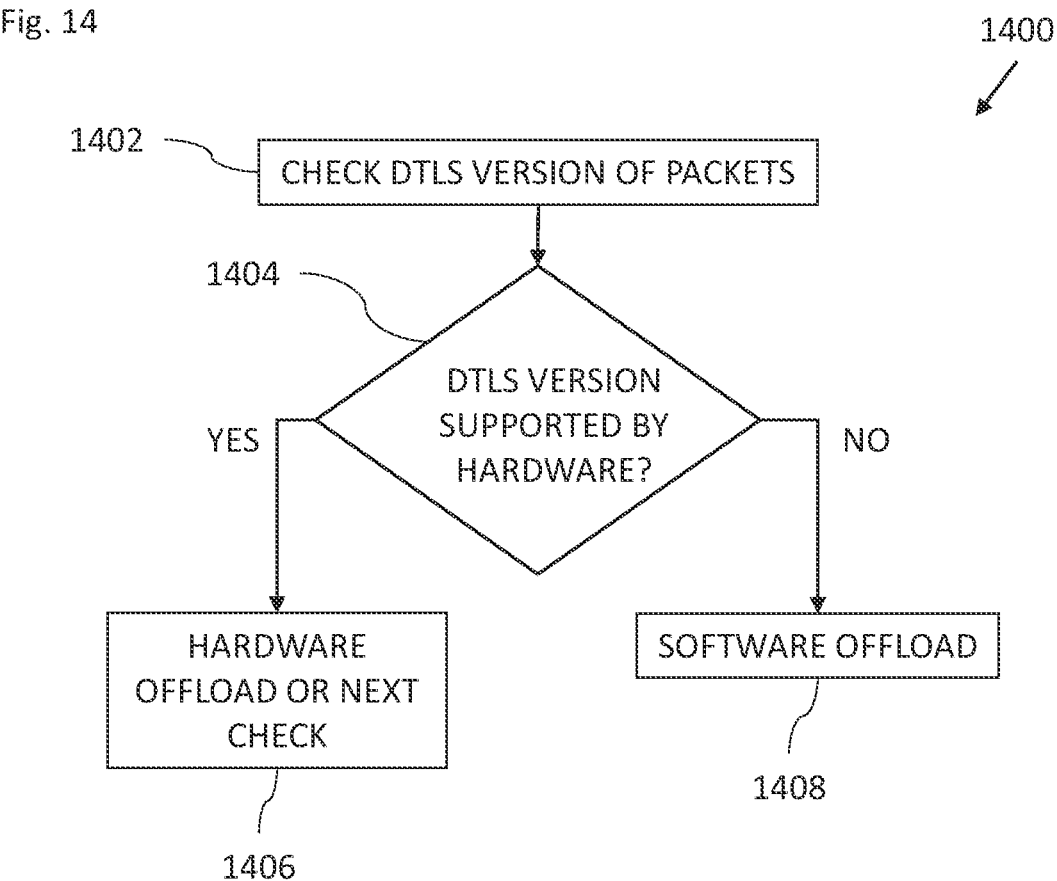

Reference is now made to FIG. 14, which is a flowchart 1400 including steps in a sub-method to check the supported DTLS version. For example, if the packet processing hardware 24 supports one version of DTLS, such as DTLS 1.2, but does not support another version of DTLS, such as DTLS 1.3, DTLS 1.2 packets may be processed in the networking device 14, whereas DTLS 1.3 packets be software offloaded to the software 20, which supports processing of DTLS 1.3 packets.

The hardware checker 36 is configured to check, for each DTLS packet arriving at the hardware checker 36, if the version 904 included in the DTLS header 900 of the received packet is supported by the packet processing hardware 24 (block 1402). At a decision block 1404, the hardware checker 36 of the packet processing hardware 24 is configured to: identify first packets for DTLS processing in the DTLS processing circuitry 38 based on the first packets being supported by a first version of DTLS; and identify second packets to bypass DTLS processing in the DTLS processing circuitry 38 and to be provided to the software 20 to perform DTLS processing on the second packets based on the second packets being supported by a second version of DTLS (different from the first version of DTLS).

The first packets proceed to hardware offload or are subject to an additional check by the packet processing hardware 24 (block 1406). The second packets proceed to software offload and bypass DTLS processing in the DTLS processing circuitry 38 (block 1408).

Figure 15:
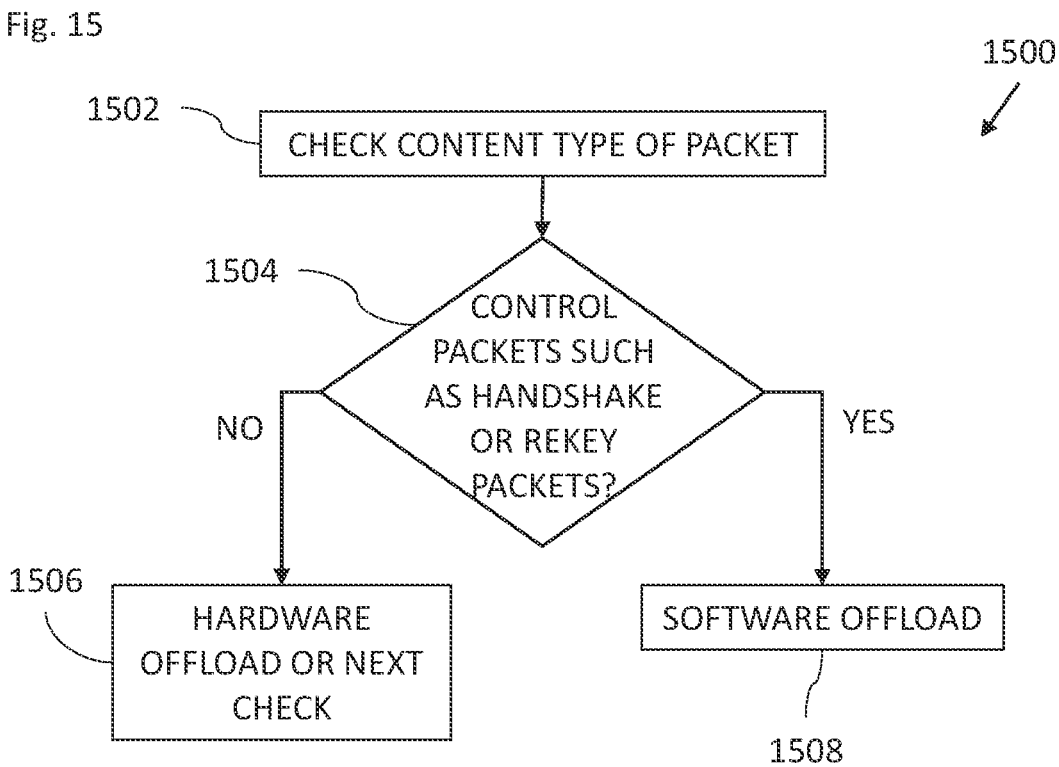

Reference is now made to FIG. 15, which is a flowchart 1500 including steps in a sub-method to check the DTLS packet type. For example, some control packets, such as handshake packets and rekey packets, which are generally processed by software 20 (running on the host device 12 or on the networking device 14), may be identified for software offload, and processed by the software 20 (running on the host device 12 or on the networking device 14) without having to perform a special treatment of these packets in the networking device 14.

The match-and-action engine 32 is configured to check the type 902 (i.e., header field content type) of the DTLS header 900 of each DTLS packet (block 1502). At a decision block 1504, the match-and-action engine 32 is configured to: identify first packets for DTLS processing in the DTLS processing circuitry 38 based on the type 902 of each of the first packets indicating a given packet type or types, e.g., an application data packet; and identify second packets to bypass DTLS processing in the DTLS processing circuitry 38 and to be provided to the software 20 to perform DTLS processing on the second packets based on the type 902 of each of the second packets indicating a different given packet type or types, e.g., a control packet such as handshake packets or rekey packets. This is an example where the first packets and the second packets may belong to the same network flow.

The first packets proceed to hardware offload or are subject to an additional check by the packet processing hardware 24 (block 1506). The second packets proceed to software offload and bypass DTLS processing in the DTLS processing circuitry 38 (block 1508).

Figure 16:
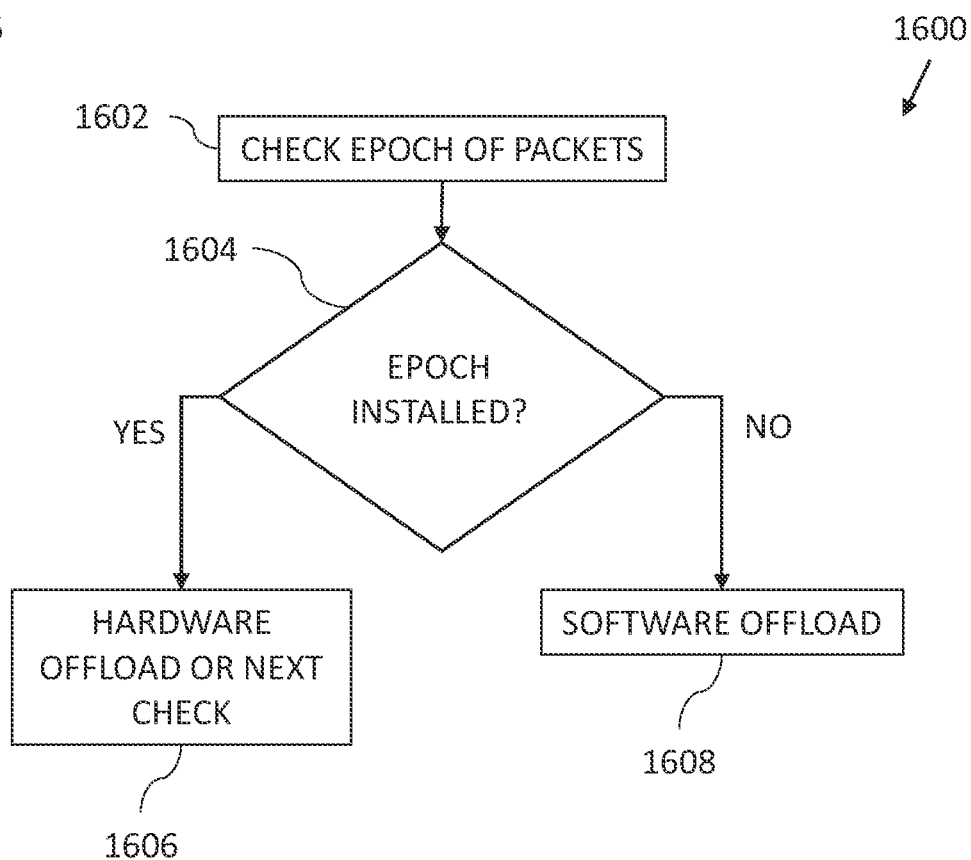

Reference is now made to FIG. 16, which is a flowchart 1600 including steps in a sub-method to check the epoch. Processing packets of a new cryptographic epoch is another example where software offload may be utilized. Cryptographic keys are refreshed periodically, e.g., each epoch. This is performed by software 20 running on the host devices 12. New cryptographic material for a new epoch is typically negotiated between software 20 running on host devices 12 over the network and then the new cryptographic material is offloaded to the packet processing hardware 24 of the networking devices 14 by the host devices 12. It may occur that one networking device 14 (e.g., device A) starts encrypting some packets according to the new cryptographic material and sends the encrypted packets to the other networking device 14 (e.g., device B), prior to the packet processing hardware 24 of the other networking device 14 (e.g., device B) receiving offload of the new cryptographic material from its host device 12. Therefore, the packets encrypted with the new cryptographic material cannot be decrypted by the other networking device 14 (e.g., device B) and would otherwise be dropped by the other networking device (e.g., device B). Therefore, in some embodiments, DTLS packets received for a new epoch are software offloaded by the receiving networking device 14 to be DTLS processed by software 20 running on the local host device 12 until cryptographic material for the new epoch is successfully offloaded by the software 20 to the packet processing hardware 24 of the network device 14.

Therefore, in some embodiments, the context fetcher 34 is configured to check the epoch 906 of the DTLS header 900 of each DTLS packet received by the context fetcher 34 and compare the epoch 906 (i.e., epoch field) in the DTLS header of each of the received DTLS packets against the valid epoch(s) installed in the networking device 14 (block 1602). At a decision block 1604, based on comparing the epoch 906 (i.e., epoch field) in the DTLS header of each of the received DTLS packets against the valid epoch(s) installed in the networking device 14, the context fetcher 34 is configured to: identify first packets (i.e., whose epoch 906 is installed in the networking device 14) for DTLS processing in the DTLS processing circuitry 38 of the packet processing circuitry 24 (block 1606); and identify second packets (i.e., whose epoch 906 is not installed in the networking device 14) for software offload and to bypass the DTLS processing in the DTLS processing circuitry 38 (block 1608).

Therefore, the second packets bypassing DTLS processing in the packet processing circuitry 24 may be packets encrypted with cryptographic material of a new cryptographic key epoch and processed by the packet processing circuitry 24 prior to the cryptographic material of the new cryptographic key epoch being offloaded by the software 20 to the packet processing hardware 24 of the networking device 14.

Once the cryptographic material (e.g., key(s) is offloaded to the packet processing hardware 24 of the networking device 14, the new epoch will be listed in the list of valid epochs, and DTLS packets of the new epoch received after this time may be processed in hardware of the networking device 14.

The first packets identified for DTLS processing in the DTLS processing circuitry 38 of the packet processing circuitry 24 (and not software offloaded) are: packets encrypted by the cryptographic material of an older epoch (already installed by the packet processing hardware 24); and/or packets encrypted by the cryptographic material of the new cryptographic key epoch and processed by the packet processing circuitry 24 after the cryptographic material of the new cryptographic key epoch has been offloaded by the software 20 to the networking device 14.

In practice, some, or all of the functions of the packet processing hardware 24 may be combined in a single physical component or, alternatively, implemented using multiple physical components. These physical components may comprise hard-wired or programmable devices, or a combination of the two. In some embodiments, at least some of the functions of the packet processing hardware 24 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 17:
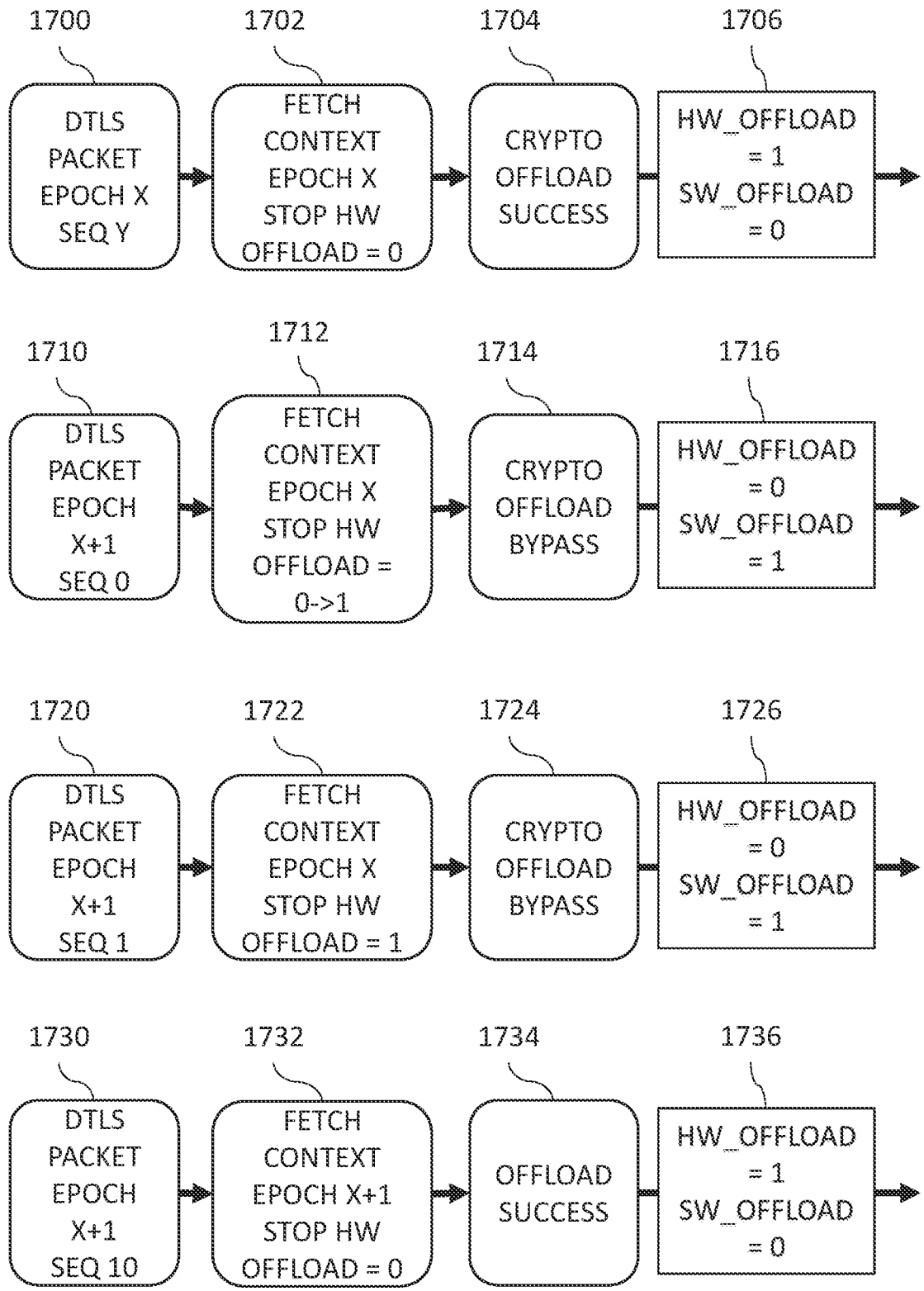

Reference is now made to FIGS. 17 and 18, which are schematic views of packet processing based on epoch values in the system 10 of FIG. 1.

FIG. 17 shows a packet 1700 received with sequence number Y and epoch X. The context fetcher 34 fetches the context and finds that epoch X is installed in the packet processing hardware 24 and leaves a stop hardware offload flag unchanged to equal 0 (block 1702). The DTLS processing circuitry 38 successfully performs the cryptographic offload (i.e., processes the DTLS packet 1700 in the DTLS processing circuitry 38) (block 1704) and generates a CQE 1706 listing the hardware offload flag as 1 and software offload flag as 0, as hardware offload was performed, and software offload is not needed. The CQE 1706 is read by software 20 and processed.

FIG. 17 shows a packet 1710 received with sequence number 0 and epoch X+1. The context fetcher 34 fetches the context and finds that epoch X is installed (but epoch X+1 is not installed) in the packet processing hardware 24 and changes the stop hardware offload flag from 0 to 1 (block 1712) to bypass hardware offload. At this point, the packet processing hardware 24 sets the hardware offload flag to 1 until informed otherwise by the software 20. This may be referred to as "sticky" configuration of the hardware offload flag. The packet 1710 bypasses cryptographic offload in the DTLS processing circuitry 38 (block 1714) and generates a CQE 1716 listing the hardware offload flag as 0 and software offload flag as 1, as hardware offload was not performed, and software offload is needed. The CQE 1716 is read by software 20 and processed, including DTLS processing of the packet 1710 by the software 20.

FIG. 17 shows a packet 1720 received with sequence number 1 and epoch X+1. The context fetcher 34 leaves the stop hardware offload flag unchanged at 1 (block 1722) to bypass hardware offload as the packet processing hardware 24 has not been informed otherwise by the software 20. The packet 1720 bypasses cryptographic offload in the DTLS processing circuitry 38 (block 1724) and generates a CQE 1726 listing the hardware offload flag as 0 and software offload flag as 1, as hardware offload was not performed, and software offload is needed. The CQE 1726 is read by software 20 and processed, including DTLS processing of the packet 1720 by the software 20.

Once the cryptographic material for epoch X+1 is offloaded by software 20 to the packet processing hardware 24, the software 20 also informs the context fetcher 34 to reset the stop hardware offload flag to 0.

FIG. 17 shows a packet 1730 received with sequence number 10 and epoch X+1. The context fetcher 34 fetches the context and finds that epoch X+1 is installed in the packet processing hardware 24 and leaves the stop hardware offload flag set to 0 (block 1732). The DTLS processing circuitry 38 successfully performs the cryptographic offload (i.e., processes the DTLS packet 1730 in the DTLS processing circuitry 38) (block 1734) and generates a CQE 1736 listing the hardware offload flag as 1 and software offload flag as 0, as hardware offload was performed, and software offload is not needed. The CQE 1736 is read by software 20 and processed.

FIG. 18 shows packet processing without the "sticky" configuration. The stop hardware offload flag automatically returns to equal 0, as described in more detail below.

FIG. 18 shows a packet 1800 received with sequence number Y and epoch X. The context fetcher 34 fetches the context and finds that epoch X is installed in the packet processing hardware 24 and leaves the stop hardware offload flag set to 0 (block 1802). The DTLS processing circuitry 38 successfully performs the cryptographic offload (i.e., processes the DTLS packet 1800 in the DTLS processing circuitry 38) (block 1804) and generates a CQE 1806 listing the hardware offload flag as 1 and software offload flag as 0, as hardware offload was performed, and software offload is not needed. The CQE 1806 is read by software 20 and processed.

FIG. 18 shows a packet 1810 received with sequence number 0 and epoch X+1. The context fetcher 34 fetches the context and finds that epoch X is installed (but epoch X+1 is not installed) in the packet processing hardware 24 and changes the stop hardware offload flag from 0 to 1 (block 1812) to bypass hardware offload. The packet 1810 bypasses cryptographic offload in the DTLS processing circuitry 38 (block 1814) and generates a CQE 1816 listing the hardware offload flag as 0 and software offload flag as 1, as hardware offload was not performed, and software offload is needed. The CQE 1816 is read by software 20 and processed, including DTLS processing of the packet 1810 by the software 20.

FIG. 18 shows a packet 1820 received with sequence number 1 and epoch X+1. The context fetcher 34 fetches the context and finds that epoch X is installed (but epoch X+1 is not installed) in the packet processing hardware 24 and changes the stop hardware offload flag from 0 to 1 (block 1822) to bypass hardware offload. The packet 1820 bypasses cryptographic offload in the DTLS processing circuitry 38 (block 1824) and generates a CQE 1826 listing the hardware offload flag as 0 and software offload flag as 1, as hardware offload was not performed, and software offload is needed. The CQE 1826 is read by software 20 and processed, including DTLS processing of the packet 1820 by the software 20.

FIG. 18 shows a packet 1830 received with sequence number 10 and epoch X+1. The context fetcher 34 fetches the context and finds that epoch X+1 is installed in the packet processing hardware 24 and leaves the stop hardware offload flag set to 0 (block 1832). The DTLS processing circuitry 38 successfully performs the cryptographic offload (i.e., processes the DTLS packet 1830 in the DTLS processing circuitry 38) (block 1834), and generates a CQE 1836 listing the hardware offload flag as 1 and software offload flag as 0, as hardware offload was performed, and software offload is not needed. The CQE 1836 is read by software 20 and processed.

Various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

The embodiments described above are cited by way of example, and the present disclosure is not limited by what has been particularly shown and described hereinabove. Rather the scope of the disclosure includes both combinations and sub-combinations of the various features described hereinabove, as well as variations and modifications thereof which would occur to persons skilled in the art upon reading the foregoing description and which are not disclosed in the prior art.

What is claimed is:

1. A system, comprising a networking device, including:
a network interface to receive network packets having headers including datagram transport layer security (DTLS) headers from a remote device over a packet data network;
packet processing circuitry to:
identify first packets of the received packets for DTLS processing in the packet processing circuitry;
identify second packets of the received packets to bypass DTLS processing in the packet processing circuitry and to be provided to software to perform DTLS processing on the second packets; and
perform DTLS processing on the first packets; and
a host interface to:
provide the DTLS processed first packets to the software; and
provide the second packets to the software to perform DTLS processing on the second packets.

2. The system according to claim 1, wherein the packet processing circuitry comprises DTLS processing circuitry to:
find at least one decryption key based on source and destination data of at least one DTLS header of the first packets;
decrypt and authenticate the first packets based on the at least one decryption key; and
perform replay protection checks based on DTLS sequence numbers of the first packets.

3. The system according to claim 1, further comprising a host device including a processor to execute the software to:
receive the second packets; and
perform DTLS processing on the second packets.

4. The system according to claim 3, wherein the software is to:
find at least one decryption key based on source and destination data of at least one DTLS header of the second packets;
decrypt and authenticate the second packets based on the at least one decryption key; and
perform replay protection checks based on DTLS sequence numbers of the second packets.

5. The system according to claim 1, wherein the packet processing circuitry is to generate completion queue elements (CQEs) for the second packets indicating that the packets are being offloaded to the software to perform DTLS processing on the second packets.

6. The system according to claim 1, wherein the packet processing circuitry comprises DTLS processing circuitry, wherein the packet processing circuitry is to indicate to the DTLS processing circuitry that the second packets are to bypass DTLS processing in the DTLS processing circuitry.

7. The system according to claim 1, wherein the packet processing circuitry is to:
identify the first packets for DTLS processing in the packet processing circuitry based on the first packets belonging to at least one first network flow; and
identify the second packets to bypass DTLS processing in the packet processing circuitry and to be provided to the software to perform DTLS processing on the second packets based on the second packets belonging to at least one second network flow.

8. The system according to claim 1, wherein the packet processing circuitry is to:
identify the first packets for DTLS processing in the packet processing circuitry based on the first packets supported by a first version of DTLS; and
identify the second packets to bypass DTLS processing in the packet processing circuitry and to be provided to the software to perform DTLS processing on the second packets based on the second packets being supported by a second version of DTLS, different from the first version of DTLS.

9. The system according to claim 1, wherein the first packets and the second packets belong to a same network flow.

10. The system according to claim 9, wherein the packet processing circuitry is configured to identify the first packets and the second packets based on header field content type of the first packet and the second packets.

11. The system according to claim 9, wherein the second packets are handshake packets.

12. The system according to claim 9, wherein:
the second packets bypassing DTLS processing in the packet processing circuitry are packets encrypted by cryptographic material of a new cryptographic key epoch and processed by the packet processing circuitry prior to the cryptographic material of the new cryptographic key epoch being offloaded by the software to the networking device; and
the first packets identified for DTLS processing in the packet processing circuitry are packets encrypted by the cryptographic material of the new cryptographic key epoch and processed by the packet processing circuitry after the cryptographic material of the new cryptographic key epoch has been offloaded by the software to the networking device.

13. The system according to claim 12, wherein the packet processing circuitry is to compare epoch fields in the DTLS headers of the packets against at least one valid epoch installed in the networking device to identify the second packets to bypass the DTLS processing and the first packets for DTLS processing in the packet processing circuitry.

14. A method, comprising:
receiving network packets having headers including datagram transport layer security (DTLS) headers from a remote device over a packet data network;
identifying first packets of the received packets for DTLS processing in packet processing circuitry;
identifying second packets of the received packets to bypass DTLS processing in the packet processing circuitry and to be provided to software to perform DTLS processing on the second packets;
performing DTLS processing on the first packets by the packet processing circuitry;
providing the DTLS processed first packets to the software; and
providing the second packets to the software to perform DTLS processing on the second packets.

15. The method according to claim 14, wherein the performing the DTLS processing on the first packets comprises:
finding at least one decryption key based on source and destination data of at least one DTLS header of the first packets;
decrypting and authenticating the first packets based on the at least one decryption key; and
performing replay protection checks based on DTLS sequence numbers of the first packets.

16. The method according to claim 14, further comprising performing DTLS processing by the software including:
finding at least one decryption key based on source and destination data of at least one DTLS header of the second packets;

decrypting and authenticate the second packets based on the at least one decryption key; and performing replay protection checks based on DTLS sequence numbers of the second packets.

17. The method according to claim 14, further comprising generating completion queue elements (CQEs) for the second packets indicating that the packets are being offloaded to the software to perform DTLS processing on the second packets.

18. The method according to claim 14, further comprising indicating to DTLS processing circuitry that the second packets are to bypass DTLS processing in the DTLS processing circuitry.

19. The method according to claim 14, further comprising:
identifying the first packets for DTLS processing in the packet processing circuitry based on the first packets belonging to at least one first network flow; and
identifying the second packets to bypass DTLS processing in the packet processing circuitry and to be provided to the software to perform DTLS processing on the second packets based on the second packets belonging to at least one second network flow.

20. The method according to claim 14, further comprising:
identifying the first packets for DTLS processing in the packet processing circuitry based on the first packets supported by a first version of DTLS; and
identifying the second packets to bypass DTLS processing in the packet processing circuitry and to be provided to the software to perform DTLS processing on the second packets based on the second packets being supported by a second version of DTLS, different from the first version of DTLS.

21. The method according to claim 14, wherein the first packets and the second packets belong to a same network flow.

22. The method according to claim 21, further comprising identifying the first packets and the second packets based on header field content type of the first packet and the second packets.

23. The method according to claim 21, wherein the second packets are handshake packets.

24. The method according to claim 21, wherein:
the second packets bypassing DTLS processing in the packet processing circuitry are packets encrypted by cryptographic material of a new cryptographic key epoch and processed by the packet processing circuitry prior to the cryptographic material of the new cryptographic key epoch being offloaded by the software to the networking device; and
the first packets identified for DTLS processing in the packet processing circuitry are packets encrypted by the cryptographic material of the new cryptographic key epoch and processed by the packet processing circuitry after the cryptographic material of the new cryptographic key epoch has been offloaded by the software to the networking device.

25. The method according to claim 24, further comprising comparing epoch fields in the DTLS headers of the packets against at least one valid epoch installed in the networking device to identify the second packets to bypass the DTLS processing and the first packets for DTLS processing in the packet processing circuitry.

* * * * *